United States Patent
Tseng

(10) Patent No.: US 12,082,292 B2
(45) Date of Patent: Sep. 3, 2024

(54) METHOD AND APPARATUS OF HANDLING DISCONTINUOUS RECEPTION (DRX) COMMAND FOR MBS (MULTICAST BROADCAST SERVICE) OPERATION IN A WIRELESS COMMUNICATION SYSTEM

(71) Applicant: ASUS Technology Licensing Inc., Taipei (TW)

(72) Inventor: Li-Chih Tseng, Taipei (TW)

(73) Assignee: ASUS Technology Licensing Inc., Taipei (TW)

(*) Notice: Subject to any disclaimer, the term of this patent is extended or adjusted under 35 U.S.C. 154(b) by 0 days.

(21) Appl. No.: 18/379,468

(22) Filed: Oct. 12, 2023

(65) Prior Publication Data

US 2024/0147573 A1    May 2, 2024

Related U.S. Application Data

(60) Provisional application No. 63/416,646, filed on Oct. 17, 2022.

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0229* (2013.01)

(58) Field of Classification Search
CPC ............ H04W 76/28; H04W 52/0216; H04W 52/0229
See application file for complete search history.

(56) References Cited

U.S. PATENT DOCUMENTS

2023/0033440 A1* 2/2023 Kadiri ................. H04L 12/189

FOREIGN PATENT DOCUMENTS

| WO | WO-2022063077 A1 * | 3/2022 | |
| WO | WO-2022231249 A1 * | 11/2022 | ........... H04L 1/1822 |
| WO | 2023036165 A1 | 3/2023 | |
| WO | WO-2023214669 A1 * | 11/2023 | |

* cited by examiner

*Primary Examiner* — Ayanah S George
(74) *Attorney, Agent, or Firm* — Skaar Ulbrich Macari, P.A.

(57) ABSTRACT

Methods, systems, and apparatuses can comprise a User Equipment (UE) in a wireless communication system applying at least a unicast discontinuous reception (DRX) configuration associated with a first onDuration timer and/or a first Inactivity timer, applying at least a multicast DRX configuration associated with a second onDuration timer and/or a second Inactivity timer, receiving a DRX Command Medium Access Control (MAC) Control Element (CE) sent from a network by a periodic (pre)-configured downlink assignment for multicast, stopping the second onDuration timer, and stopping the second Inactivity timer.

7 Claims, 12 Drawing Sheets

METHOD AND APPARATUS OF HANDLING DISCONTINUOUS RECEPTION (DRX) COMMAND FOR MBS (MULTICAST BROADCAST SERVICE) OPERATION IN A WIRELESS COMMUNICATION SYSTEM

CROSS-REFERENCE TO RELATED APPLICATIONS

The present Application claims priority to and the benefit of U.S. Provisional Patent Application Ser. No. 63/416,646, filed Oct. 17, 2022, which is fully incorporated herein by reference.

FIELD

This disclosure generally relates to wireless communication networks and, more particularly, to a method and apparatus for a handling discontinuous reception (DRX) command for Multicast Broadcast Service (MBS) operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling a discontinuous reception (DRX) command for Multicast Broadcast Service (MBS) operation in a wireless communication system. If a gNB is allowed to schedule a DRX Command Medium Access Control (MAC) Control Element (CE) for multicast (transmission) (for a group User Equipment (UE)) on a pre-configured downlink assignment/resource (e.g., Multicast-Broadcast Services (MBS), Semi-Persistent Scheduling (SPS)) or by a Physical Downlink Control Channel (PDCCH) addressed to a Group (G)-Configured Scheduling (CS)-Radio Network Temporary Identifier (RNTI) or a Configured Scheduling (CS)-RNTI (i.e., Precision Time Protocol (PTP) retransmission for Point-to-Multipoint (PTM)), a UE would not perform stopping the relevant DRX timer based on the DRX Command MAC CE for saving UE power according to the conventional methods. Through the disclosed methods and apparatuses of the present invention, the gNB can have more opportunities or be allowed for scheduling DRX Command MAC CE for multicast on a pre-configured Downlink (DL) assignment or by a PDCCH addressed to G-CS-RNTI and, accordingly, the UE can perform the DRX Command so as to stop the relevant DRX Timers for saving UE power on PDCCH monitoring.

In various embodiments, a method for a UE in a wireless communication system comprises applying at least a unicast DRX configuration associated with a first onDuration timer and/or a first Inactivity timer, applying at least a multicast DRX configuration associated with a second onDuration timer and/or a second Inactivity timer, receiving a DRX Command MAC CE sent from a network by a periodic (pre)-configured downlink assignment for multicast, stopping the second onDuration timer, and stopping the second Inactivity timer.

In various embodiments, a method for a UE in a wireless communication system comprises applying at least a unicast DRX configuration associated with a first onDuration timer and/or a first Inactivity timer, applying at least a multicast DRX configuration associated with a second onDuration timer and/or a second Inactivity timer, receiving a first DRX Command MAC CE sent from a network by a periodic (pre)-configured downlink assignment for unicast, stopping the first onDuration timer in response to reception of the first DRX Command MAC CE, stopping the first Inactivity timer in response to reception of the first DRX Command MAC CE, receiving a second DRX Command MAC CE sent from the network by a periodic (pre)-configured downlink assignment for multicast, stopping the second onDuration timer in response to reception of the second DRX Command MAC CE, and stopping the second Inactivity timer in response to reception of the second DRX Command MAC CE.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 36.331 V16.0.0 (2020-03), "3GPP TSG RAN; Radio Resource Control (RRC) protocol specification (Release 16)"; [2] 3GPP TS 36.321 V16.0.0 (2020-03), "3GPP TSG RAN; Medium Access Control (MAC) protocol specification (Release 16)"; [3] 3GPP TS 38.321 V17.2.0 (2022-09), "3GPP TSG RAN; Medium Access Control (MAC) protocol specification (Release 17)"; [4] 3GPP TS 38.300 V17.1.0 (2022-06), "3GPP TSG RAN; NR; NR and NG-RAN Overall Description; Stage 2 (Release 17)"; [5] 3GPP TS 38.213 V17.2.0 (2022-06), "3GPP TSG RAN; NR; NR and NG-RAN Overall Description; Stage 2 (Release 17)"; [6] 3GPP TS 38.331 V17.1.0 (2022-06), "3GPP TSG RAN; NR; Radio Resource Control (RRC) protocol specification (Release 17)"; and [7] R2-2209656 "Clarifications on DRX and HARQ buffer handling" Huawei, CBN, HiSilicon. The standards and documents listed above are hereby expressly and fully incorporated herein by reference in their entirety.

Figure 1:
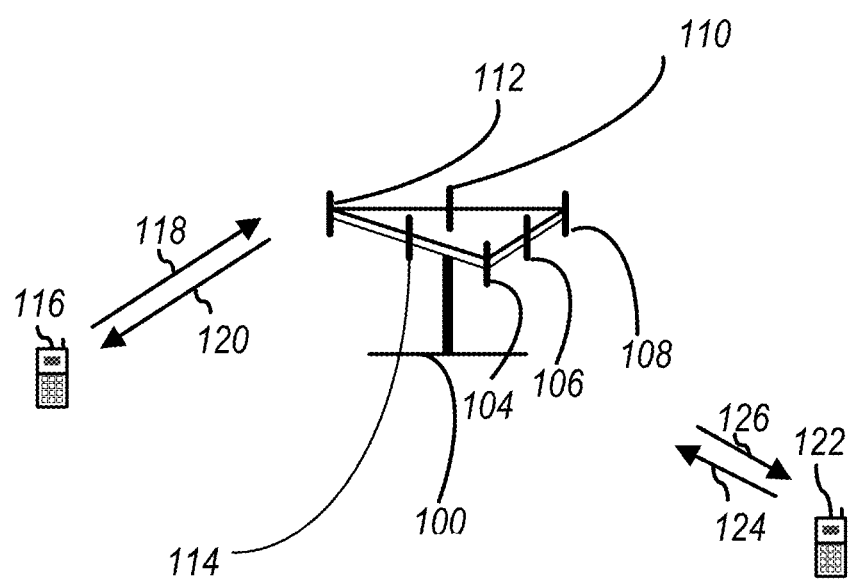
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
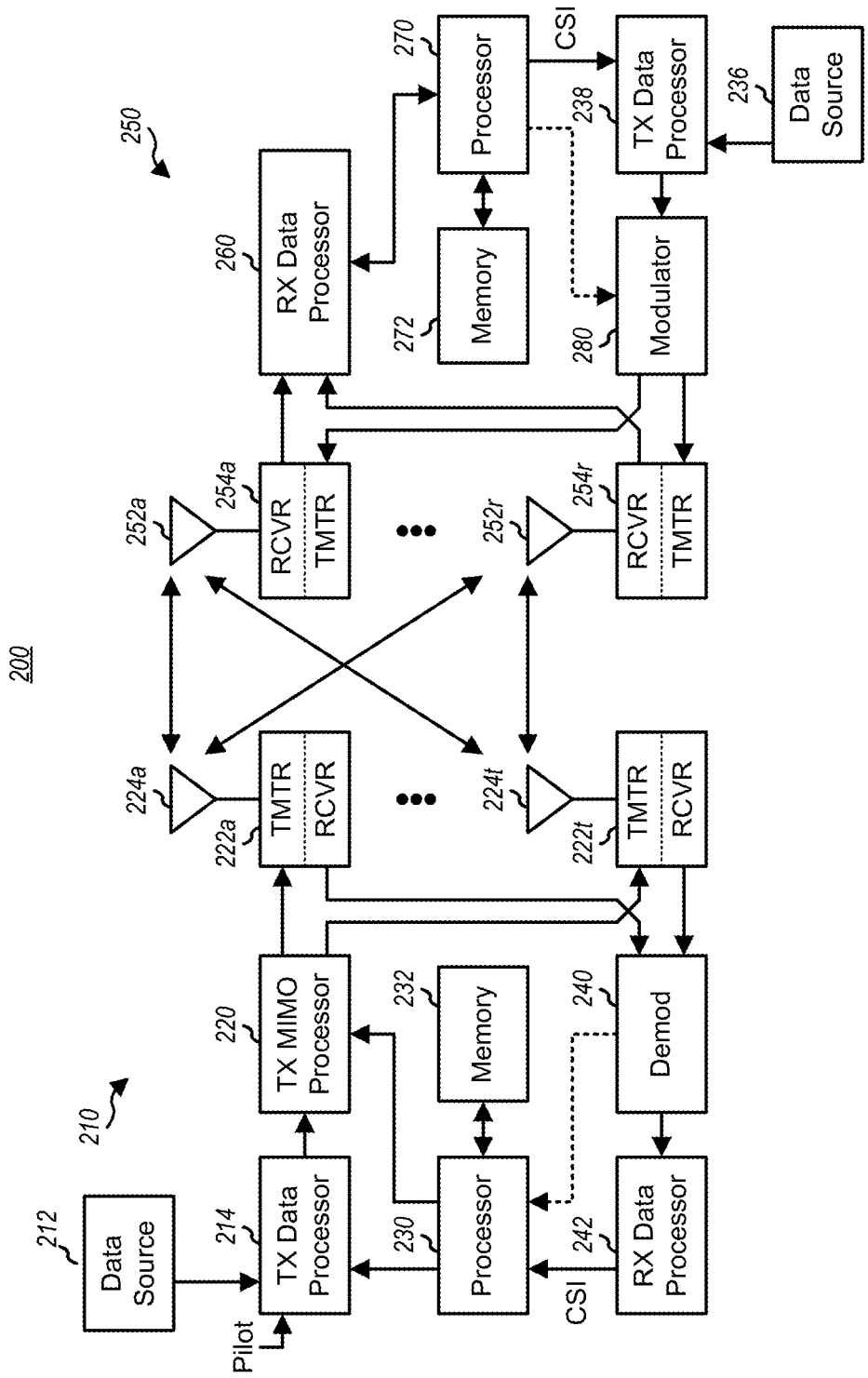
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
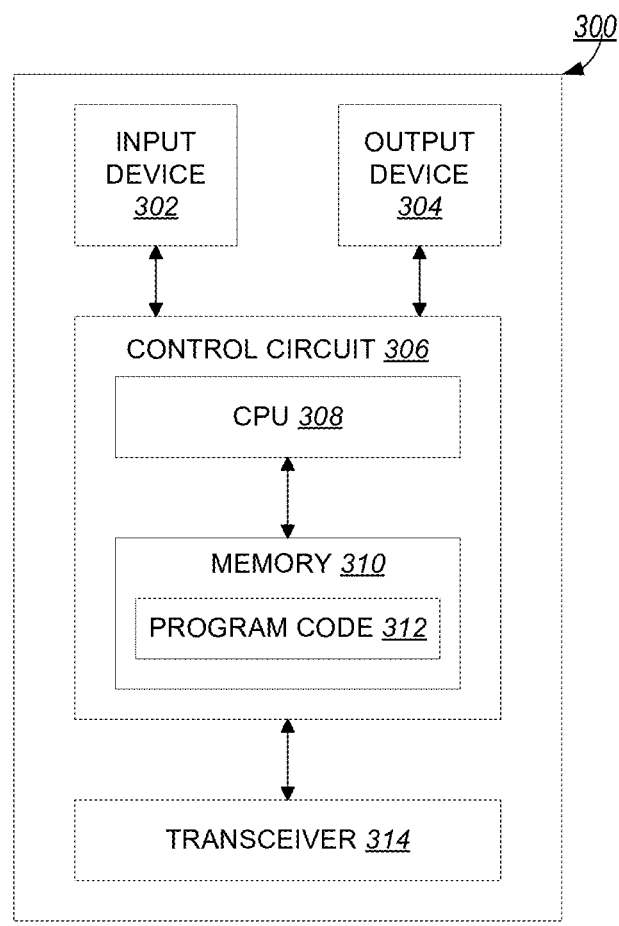
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
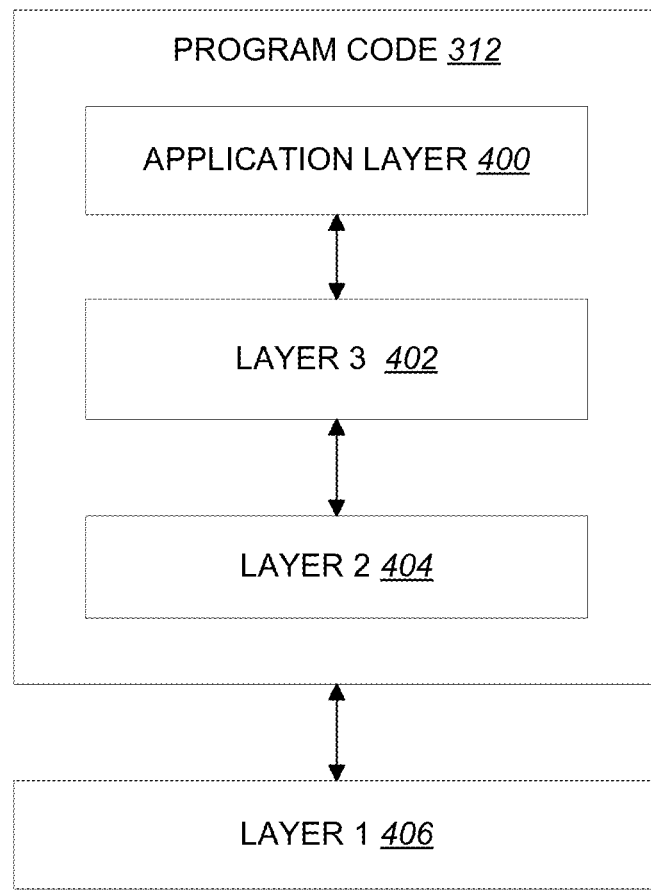
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In TS 36.331 V16.0.0 (2020-03) ([1] 3GPP TS 36.331 V16.0.0 (2020-03), "3GPP TSG RAN; Radio Resource Control (RRC) protocol specification (Release 16)"), some quotations are shown as below.

Quotation Start 6.3.7a SC-PTM Information Elements
SC-MTCH-InfoList
The IE SC-MTCH-InfoList provides the list of ongoing MBMS sessions transmitted via SC-MRB and for each MBMS session, the associated G-RNTI and scheduling information.

SC-MTCH-InfoList Information Element

```
-- ASN1START
SC-MTCH-InfoList-r13 : =      SEQUENCE (SIZE (0..maxSC-MTCH-r13)) OF SC-MTCH-Info-r13
SC-MTCH-Info-r13 ::=          SEQUENCE    {
    mbmsSessionInfo-r13           MBMSSessionInfo-r13,
    g-RNTI-r13                    BIT STRING(SIZE(16)),
    sc-mtch-schedulingInfo-r13    SC-MTCH-SchedulingInfo-r13        OPTIONAL,    -- Need OP
```

```
    sc-mtch-neighbourCell-r13           BIT STRING (SIZE(maxNeighCell-SCPTM-r13))  OPTIONAL,  -- Need
OP
    ...,
    [[      p-a-r13                     ENUMERATED {
                                           dB-6, dB-4dot77, dB-3, dB-1dot77,
                                           dB0, dB1, dB2, dB3}       OPTIONAL   -- Need ON
    ]]
}
MBMSSessionInfo-r13 ::=        SEQUENCE       {
    tmgi-r13                            TMGI-r9,
    sessionId-r13                       OCTET STRING (SIZE (1))       OPTIONAL   -- Need OR
}
SC-MTCH-SchedulingInfo-r13::=  SEQUENCE       {
    onDurationTimerSCPTM-r13            ENUMERATED {
                                           psf1, psf2, psf3, psf4, psf5, psf6,
                                           psf8, psf10, psf20, psf30, psf40,
                                           psf50, psf60, psf80, psf100,
                                           psf200},
    drx-InactivityTimerSCPTM-r13        ENUMERATED {
                                           psf0, psf1, psf2, psf4, psf8,
                                           psf10, psf20, psf40,
                                           psf80, psf160, ps320,
                                           psf640, psf960,
                                           psf1280, psf1920, psf2560},
    schedulingPeriodStartOffsetSCPTM-r13  CHOICE {
                sf10                    INTEGER(0..9),
                sf20                    INTEGER(0..19),
                sf32                    INTEGER(0..31),
                sf40                    INTEGER(0..39),
                sf64                    INTEGER(0..63),
                sf80                    INTEGER(0..79),
                sf128                   INTEGER(0..127),
                sf160                   INTEGER(0..159),
                sf256                   INTEGER(0..255),
                sf320                   INTEGER(0..319),
                sf512                   INTEGER(0..511),
                sf640                   INTEGER(0..639),
                sf1024                  INTEGER(0..1023),
                sf2048                  INTEGER(0..2048),
                sf4096                  INTEGER(0..4096),
                sf8192                  INTEGER(0..8192)
    },
    ...
}
-- ASN1STOP
```

| SC-MTCH-InfoList field descriptions |
|---|
| drx-Inactivity TimerSCPTM |
| Timer for SC-MTCH in TS 36.321 [6]. Value in number of PDCCH sub-frames. Value psf0 corresponds to 0 PDCCH sub-frame and behaviour as specified in 7.3.2 applies, psf1 corresponds to 1 PDCCH sub-frame, psf2 corresponds to 2 PDCCH sub-frames and so on. |
| g-RNTI |
| G-RNTI used to scramble the scheduling and transmission of a SC-MTCH. |
| mbmsSessionInfo |
| Indicates the ongoing MBMS session in a SC-MTCH. |
| onDuration TimerSCPTM |
| Timer for SC-MTCH reception in TS 36.321 [6]. Value in number of PDCCH sub-frames. Value psf1 corresponds to 1 PDCCH sub-frame, psf2 corresponds to 2 PDCCH sub-frames and so on. |
| p-a |
| Parameter: P''$_A$, for the SC-MTCH per G-RNTI, see TS 36.213 [23], clause 5.2. Value dB −6 corresponds to −6 dB, dB −4dot77 corresponds to −4.77 dB etc. |
| schedulingPeriodStartOffsetSCPTM |
| SCPTM-SchedulingCycle and SCPTM-SchedulingOffset in TS 36.321 [6]. The value of SCPTM-SchedulingCycle is in number of sub-frames. Value sf10 corresponds to 10 sub-frames, sf20 corresponds to 20 sub-frames and so on. The value of SCPTM-SchedulingOffset is in number of sub-frames. The E-UTRAN does not configure a maximum value 2048 for sf2048, 4096 for sf4096 or 8192 for sf8192. |
| sc-mtch-neighbourCell |
| Indicates neighbour cells which also provide this service on SC-MTCH. The first bit is set to 1 if the service is provided on SC-MTCH in the first cell in scptmNeighbourCellList, otherwise it is set to 0. The second bit is set to 1 if the service is provided on SC-MTCH in the second cell in scptmNeighbourCellList, and so on. If this field is absent, the UE shall assume that this service is not available on SC-MTCH in any neighbour cell. |
| sc-mtch-schedulingInfo |
| DRX information for the SC-MTCH. If this field is absent, the SC-MTCH may be scheduled in any subframe. |

Quotation End

In TS 36.321 V16.0.0 ([2] 3GPP TS 36.321 V16.0.0 (2020-03), "3GPP TSG RAN; Medium Access Control (MAC) protocol specification (Release 16)"), some quotations are shown as below.

Quotation Start 5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), UL Semi-Persistent Scheduling V-RNTI (if configured), eIMTA-RNTI (if configured), SL-RNTI (if configured), SL-V-RNTI (if configured), CC-RNTI (if configured), SRS-TPC-RNTI (if configured), and AUL C-RNTI (if configured). When in RRC_CONNECTED, if DRX is configured, the MAC entity is allowed to monitor the PDCCH discontinuously using the DRX operation specified in this clause; otherwise the MAC entity monitors the PDCCH continuously. When using DRX operation, the MAC entity shall also monitor PDCCH according to requirements found in other clauses of this specification. RRC controls DRX operation by configuring the timers onDurationTimer, drx-InactivityTimer, drx-RetransmissionTimer (for HARQ processes scheduled using 1 ms TTI, one per DL HARQ process except for the broadcast process), drx-RetransmissionTimerShorttTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShorttTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see clause 7.7).

When a DRX cycle is configured, the Active Time includes the time while:

5.7a Discontinuous Reception (DRX) for SC-PTM

Each G-RNTI and, for NB-IoT UEs, BL UEs or UEs in enhanced coverage, each SC-RNTI of the MAC entity may be configured by RRC with a DRX functionality that controls the UE's PDCCH monitoring activity for this G-RNTI and SC-RNTI as specified in TS 36.331 [8]. When in RRC_IDLE or RRC_CONNECTED, if DRX is configured, the MAC entity is allowed to monitor the PDCCH for this G-RNTI or SC-RNTI discontinuously using the DRX operation specified in this clause; otherwise the MAC entity monitors the PDCCH for this G-RNTI or SC-RNTI continuously. For each G-RNTI or SC-RNTI of the MAC entity, RRC controls its DRX operation by configuring the timers onDurationTimerSCPTM, drx-InactivityTimerSCPTM, the SCPTM-SchedulingCycle and the value of the SCPTM-SchedulingOffset for G-RNTI and for SC-RNTI. The DRX operation specified in this clause is performed independently for each G-RNTI and SC-RNTI and independently from the DRX operation specified in subcaluse 5.7.

When DRX is configured for a G-RNTI or for SC-RNTI, the Active Time includes the time while:
  onDurationTimerSCPTM or drx-InactivityTimerSCPTM is running.

When DRX is configured for a G-RNTI or for SC-RNTI as specified in TS 36.331 [8], the MAC entity shall for each subframe for this G-RNTI or SC-RNTI:
  if [(H-SFN*10240+SFN*10)+subframe number] modulo (SCPTM-SchedulingCycle)=SCPTM-SchedulingOffset:
    start onDurationTimerSCPTM.
  during the Active Time, for a PDCCH-subframe:
    monitor the PDCCH;
    if the PDCCH indicates a DL transmission:
      if the UE is a BL UE or a UE in enhanced coverage:
        start or re-start the drx-InactivityTimerSCPTM in the subframe containing the last repetition of the corresponding PDSCH reception.
      if the UE is an NB-IoT UE:
        stop onDurationTimerSCPTM;
        stop drx-InactivityTimerSCPTM;
        start the drx-InactivityTimerSCPTM in the first subframe of the next PDCCH occasion following the subframe containing the last repetition of the corresponding PDSCH reception.
      else:
        start or restart drx-InactivityTimerSCPTM.
  NOTE: If H-SFN is not configured its value is set to 0 in the calculation of the starting subframe.

Quotation End

In TS 38.321 V17.2.0 ([3] 3GPP TS 38.321 V17.2.0 (2022-09), "3GPP TSG RAN; Medium Access Control (MAC) protocol specification (Release 17)"), some quotations are shown as below.

Quotation Start 5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: Void

RRC controls DRX operation by configuring the following parameters:
  drx-onDurationTimer: the duration at the beginning of a DRX cycle;
  drx-SlotOffset: the delay before starting the drx-onDurationTimer;
  drx-InactivityTimer: the duration after the PDCCH occasion in which a PDCCH indicates a new UL, DL or SL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

drx-RetransmissionTimerSL (per SL HARQ process): the maximum duration until a grant for SL retransmission is received;

drx-HARQ-RTT-TimerSL (per SL HARQ process): the minimum duration before an SL retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started;

downlinkHARQ-FeedbackDisabled (optional): the configuration to enable HARQ feedback per DL HARQ process;

uplinkHARQ-Mode (optional): the configuration to set HARQmodeA or HARQmodeB per UL HARQ process.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-Slot Offset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RTT-TimerUL, downlinkHARQ-FeedbackDisabled (optional) and uplinkHARQ-Mode (optional).

When DRX is configured, the Active Time for Serving Cells in a DRX group includes the time while:

drx-onDurationTimer or drx-InactivityTimer configured for the DRX group is running; or drx-RetransmissionTimerDL, drx-RetransmissionTimerUL or drx-RetransmissionTimerSL is running on any Serving Cell in the DRX group; or ra-ContentionResolutionTimer (as described in clause 5.1.5) or msgB-Response Window (as described in clause 5.1.4a) is running; or a Scheduling Request is sent on PUCCH and is pending (as described in clause 5.4.4 or 5.22.1.5). If this Serving Cell is part of a non-terrestrial network, the Active Time is started after the Scheduling Request transmission that is performed when the SR_COUNTER is 0 for all the SR configurations with pending SR(s) plus the UE-gNB RTT; or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

The following MAC timers are used for DRX operation in a non-terrestrial network:

HARQ-RTT-TimerDL-NTN (per DL HARQ process configured with HARQ feedback enabled): the minimum duration before a DL assignment for HARQ retransmission is expected by the MAC entity;

HARQ-RTT-TimerUL-NTN (per UL HARQ process configured with HARQModeA): the minimum duration before a UL HARQ retransmission grant is expected by the MAC entity.

When DRX is configured, the MAC entity shall:

1> if a MAC PDU is received in a configured downlink assignment for unicast:
  2> if this Serving Cell is configured with downlinkHARQ-FeedbackDisabled:
    3> if the corresponding HARQ process is configured with HARQ feedback enabled:
      4> set HARQ-RTT-TimerDL-NTN for the corresponding HARQ process equal to drx-HARQ-RTT-TimerDL plus the latest available UE-gNB RTT value;
      4> start the HARQ-RTT-TimerDL-NTN for the corresponding HARQ process in the first symbol after the end of the corresponding transmission carrying the DL HARQ feedback.
  2> else:
    3> start the drx-HARQ-RTT-TimerDL for the corresponding HARQ process in the first symbol after the end of the corresponding transmission carrying the DL HARQ feedback.

NOTE 1a: Void.

NOTE 1b: Void.

2> stop the drx-RetransmissionTimerDL for the corresponding HARQ process;
  2> stop the drx-RetransmissionTimerDL-PTM for the corresponding HARQ process.

1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.

1> if a HARQ-RTT-TimerDL-NTN expires:
  2> if the data of the corresponding HARQ process was not successfully decoded:
    3> start the drx-RetransmissionTimerDL for the corresponding HARQ process in the first symbol after the expiry of HARQ-RTT-TimerDL-NTN.

1> if a drx-HARQ-RTT-TimerUL expires:
  2> start the drx-RetransmissionTimerUL for the corresponding HARQ process in the first symbol after the expiry of drx-HARQ-RTT-TimerUL.

1> if a HARQ-RTT-TimerUL-NTN expires:
  2> start the drx-RetransmissionTimerUL for the corresponding HARQ process in the first symbol after the expiry of HARQ-RTT-TimerUL-NTN.

1> if a DRX Command MAC CE with DCI scrambled with C-RNTI for unicast transmission or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE with DCI scrambled with C-RNTI for unicast transmission is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN×10)+subframe number] modulo (drx-ShortCycle)=(drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN×10)+subframe number] modulo (drx-LongCycle)=drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2>else:
    3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.
1> if a DRX group is in Active Time:
  2> monitor the PDCCH on the Serving Cells in this DRX group as specified in TS 38.213 [6];
  2> if the PDCCH indicates a DL transmission; or
  2> if the PDCCH indicates a one-shot HARQ feedback as specified in clause 9.1.4 of TS 38.213 [6]; or
  2> if the PDCCH indicates a retransmission of HARQ feedback as specified in clause 9.1.5 of TS 38.213 [6]:
    3> if this Serving Cell is configured with downlinkHARQ-FeedbackDisabled:
      4> if the corresponding HARQ process is configured with HARQ feedback enabled:
        5> set HARQ-RTT-TimerDL-NTN for the corresponding HARQ process equal to drx-HARQ-RTT-TimerDL plus the latest available UE-gNB RTT value;
        5> start the HARQ-RTT-TimerDL-NTN for the corresponding HARQ process in the first symbol after the end of the corresponding transmission carrying the DL HARQ feedback.
    3> else:
      4> start or restart the drx-HARQ-RTT-TimerDL for the corresponding HARQ process(es) whose HARQ feedback is reported in the first symbol after the end of the corresponding transmission carrying the DL HARQ feedback.
NOTE 3: When HARQ feedback is postponed by PDSCH-to-HARQ_feedback timing indicating an inapplicable k1 value, as specified in TS 38.213 [6], the corresponding transmission opportunity to send the DL HARQ feedback is indicated in a later PDCCH requesting the HARQ-ACK feedback.
    3> stop the drx-RetransmissionTimerDL for the corresponding HARQ process(es) whose HARQ feedback is reported;
    3> stop the drx-RetransmissionTimerDL-PTM for the corresponding HARQ process;
    3> if the PDSCH-to-HARQ_feedback timing indicate an inapplicable k1 value as specified in TS 38.213 [6]:
      4> start the drx-RetransmissionTimerDL in the first symbol after the (end of the last) PDSCH transmission (within a bundle) for the corresponding HARQ process.
  2> if the PDCCH indicates a UL transmission:
    3> if this Serving Cell is configured with uplinkHARQ-Mode:
      4> if the corresponding HARQ process is configured as HARQModeA:
        5> set HARQ-RTT-TimerUL-NTN for the corresponding HARQ process equal to drx-HARQ-RTT-TimerUL plus the latest available UE-gNB RTT value;
        5> if drx-LastTransmissionUL is configured:
          6> start the HARQ-RTT-TimerUL-NTN for the corresponding HARQ process in the first symbol after the end of the last transmission (within a bundle) of the corresponding PUSCH transmission.
        5> else:
          6> start the HARQ-RTT-TimerUL-NTN for the corresponding HARQ process in the first symbol after the end of the first transmission (within a bundle) of the corresponding PUSCH transmission.
3> else:
4> if drx-LastTransmissionUL is configured:
5> start the drx-HARQ-RTT-TimerUL for the corresponding HARQ process in the first symbol after the end of the last transmission (within a bundle) of the corresponding PUSCH transmission.
4> else:
5> start the drx-HARQ-RTT-TimerUL for the corresponding HARQ process in the first symbol after the end of the first transmission (within a bundle) of the corresponding PUSCH transmission.
3> stop the drx-RetransmissionTimerUL for the corresponding HARQ process.
2> if the PDCCH indicates an SL transmission:
2> if the PDCCH indicates a new transmission (DL, UL or SL) on a Serving Cell in this DRX group:
3> start or restart drx-InactivityTimer for this DRX group in the first symbol after the end of the PDCCH reception.
NOTE 3a: A PDCCH indicating activation of SPS, configured grant type 2, or configured sidelink grant of configured grant Type 2 is considered to indicate a new transmission.
NOTE 3b: If the PDCCH reception includes two PDCCH candidates from corresponding search spaces, as described in clause 10.1 in 38.213, start or restart drx-InactivityTimer for this DRX group in the first symbol after the end of the PDCCH candidate that ends later in time.
2> if a HARQ process receives downlink feedback information and acknowledgement is indicated:
3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause; and
2> if allowCSI-SRS-Tx-MulticastDRX-Active is not configured or, if all multicast DRXes would not be in Active Time considering multicast assignments/DRX Command MAC CE for MBS multicast received until 4 ms prior to symbol n when evaluating all DRX Active Time conditions as specified in Clause 5.7b and all multicast sessions are configured with multicast DRX:
3> not transmit periodic SRS and semi-persistent SRS defined in TS 38.214 [7];
3> not report semi-persistent CSI configured on PUSCH;
3> if ps-TransmitPeriodicL1-RSRP is not configured with value true:
4> not report periodic CSI that is L1-RSRP on PUCCH.
3> if ps-TransmitOtherPeriodicCSI is not configured with value true:
4> not report periodic CSI that is not L1-RSRP on PUCCH.
1> else:
2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause; and
2> if allowCSI-SRS-Tx-MulticastDRX-Active is not configured or, in current symbol n, if all multicast DRXes corresponding to the DRX group would not be in Active Time considering multicast assignments/DRX Command MAC CE for MBS multicast received until 4 ms prior to symbol n when evaluating all DRX Active Time conditions as specified in Clause 5.7b and all multicast sessions corresponding to the DRX group are configured with multicast DRX:
3> not transmit periodic SRS and semi-persistent SRS defined in TS 38.214 [7] in this DRX group;
3> not report CSI on PUCCH and semi-persistent CSI configured on PUSCH in this DRX group.
2> if CSI masking (csi-Mask) is setup by upper layers:
3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
3> if allowCSI-SRS-Tx-MulticastDRX-Active is not configured or, in current symbol n, if drx-onDurationTimerPTM(s) of all multicast DRXes corresponding to the DRX group would not be running considering multicast assignments and DRX Command MAC CE for MBS multicast received until 4 ms prior to symbol n when evaluating all DRX Active Time conditions as specified in Clause 5.7b and all multicast sessions corresponding to the DRX group are configured with multicast DRX:
4> not report CSI on PUCCH in this DRX group.
NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource either outside DRX Active Time of the DRX group in which this PUCCH is configured or outside the on-duration period of the DRX group in which this PUCCH is configured if CSI masking is setup by upper layers, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

5.7b Discontinuous Reception (DRX) for MBS Multicast

For MBS multicast, the MAC entity may be configured by RRC with a DRX functionality per G-RNTI or per G-CS-RNTI that controls the UE's PDCCH monitoring activity for the MAC entity's G-RNTI(s) and G-CS-RNTI(s) as specified in TS 38.331 [5]. When in RRC_CONNECTED, if multicast DRX is configured, the MAC entity is allowed to monitor the PDCCH for this G-RNTI or G-CS-RNTI discontinuously using the multicast DRX operation specified in this clause; otherwise the MAC entity monitors the PDCCH for this G-RNTI or G-CS-RNTI as specified in TS 38.213 [6]. The multicast DRX operation specified in this clause is performed independently for each G-RNTI or G-CS-RNTI and independently from the DRX operation specified in clauses 5.7 and 5.7a.

RRC controls multicast DRX operation per G-RNTI or per G-CS-RNTI by configuring the following parameters:
  drx-onDurationTimerPTM: the duration at the beginning of a DRX cycle;
  drx-SlotOffsetPTM: the delay before starting the drx-onDurationTimerPTM;
  drx-InactivityTimerPTM: the duration after the PDCCH occasion in which a PDCCH indicates a new DL multicast transmission for the MAC entity;
  drx-LongCycleStartOffsetPTM: the long DRX cycle drx-LongCycle-PTM and drx-StartOffset-PTM which defines the subframe where the long DRX cycle starts;
  drx-RetransmissionTimerDL-PTM (per DL HARQ process for MBS multicast): the maximum duration until a DL multicast retransmission is received;
  drx-HARQ-RTT-TimerDL-PTM (per DL HARQ process for MBS multicast): the minimum duration before a DL multicast assignment for HARQ retransmission is expected by the MAC entity.

When multicast DRX is configured for a G-RNTI or G-CS-RNTI, the Active Time includes the time while:
  drx-onDurationTimerPTM or drx-InactivityTimerPTM or drx-RetransmissionTimerDL-PTM for this G-RNTI or G-CS-RNTI is running When multicast DRX is configured for a G-RNTI or G-CS-RNTI, the MAC entity shall for this G-RNTI or G-CS-RNTI:
  1> if a MAC PDU is received in a configured downlink multicast assignment:
    2> if HARQ feedback is enabled:
      3> start the drx-HARQ-RTT-TimerDL-PTM for the corresponding HARQ process in the first symbol after the end of the corresponding transmission carrying the DL HARQ feedback;
      3> start the drx-HARQ-RTT-TimerDL for the corresponding HARQ process in the first symbol after the end of the corresponding transmission carrying the DL HARQ feedback.
    2> stop the drx-RetransmissionTimerDL-PTM for the corresponding HARQ process;
    2> stop the drx-RetransmissionTimerDL for the corresponding HARQ process.
  1> if a drx-HARQ-RTT-TimerDL-PTM expires:
    2> if the data of the corresponding HARQ process was not successfully decoded:
      3> start the drx-RetransmissionTimerDL-PTM for the corresponding HARQ process in the first symbol after the expiry of drx-HARQ-RTT-TimerDL-PTM.
  1> if a DRX Command MAC CE with DCI scrambled with a G-RNTI is received:
    2> stop drx-onDurationTimerPTM of the DRX for this G-RNTI;
    2> stop drx-InactivityTimerPTM of the DRX for this G-RNTI.
  1> if [(SFN×10)+subframe number] modulo (drx-LongCycle-PTM)=drx-StartOffset-PTM:
    2> start drx-onDurationTimerPTM after drx-SlotOffsetPTM from the beginning of the subframe.
  1> if the MAC entity is in Active Time for this G-RNTI or G-CS-RNTI:
    2> monitor the PDCCH for this G-RNTI or G-CS-RNTI as specified in TS 38.213 [6];
    2> if the PDCCH indicates a DL multicast transmission:
      3> if HARQ feedback is enabled:
        4> start the drx-HARQ-RTT-TimerDL-PTM for the corresponding HARQ process in the first symbol after the end of the corresponding transmission carrying the DL HARQ feedback;
        4> start the drx-HARQ-RTT-TimerDL for the corresponding HARQ process in the first symbol after the end of the corresponding transmission carrying the DL HARQ feedback.
      3> stop the drx-RetransmissionTimerDL-PTM for the corresponding HARQ process;
      3> stop the drx-RetransmissionTimerDL for the corresponding HARQ process.
    2> if the PDCCH indicates a new multicast transmission for this G-RNTI or G-CS-RNTI:
      3> start or restart drx-InactivityTimerPTM in the first symbol after the end of the PDCCH reception.
  NOTE: A PDCCH indicating activation of multicast SPS is considered to indicate a new transmission.

The MAC entity needs not to monitor the PDCCH for a G-RNTI or a G-CS-RNTI if it is not a complete PDCCH occasion (e.g. the Active Time for a G-RNTI or a G-CS-RNTI starts or ends in the middle of a PDCCH occasion).

6.1.3.5 DRX Command MAC CE

The DRX Command MAC CE is identified by a MAC subheader with LCID as specified in Table 6.2.1-1. It has a fixed size of zero bits.

6.2.1 MAC Subheader for DL-SCH and UL-SCH

The MAC subheader consists of the following fields:
  LCID: The Logical Channel ID field identifies the logical channel instance of the corresponding MAC SDU or the type of the corresponding MAC CE or padding as described in Tables 6.2.1-1, 6.2.1-1c and 6.2.1-2 for the DL-SCH and UL-SCH respectively. There is one LCID field per MAC subheader. The size of the LCID field is 6 bits. If the LCID field is set to 34, one additional octet is present in the MAC subheader containing the eLCID field and follow the octet containing LCID field. If the LCID field is set to 33, two additional octets are present in the MAC subheader containing the eLCID field and these two additional octets follow the octet containing LCID field;
  NOTE 1: For MBS broadcast, a logical channel is identified based on G-RNTI and LCID if the same LCID is allocated for logical channels corresponding to different G-RNTIs.
  eLCID: The extended Logical Channel ID field identifies the logical channel instance of the corresponding MAC SDU or the type of the corresponding MAC CE as described in tables 6.2.1-1a, 6.2.1-1b, 6.2.1-2a and 6.2.1-2b for the DL-SCH and UL-SCH respectively. The size of the eLCID field is either 8 bits or 16 bits.
  NOTE 2: The extended Logical Channel ID space using two-octet eLCID and the relevant MAC subheader format is used, only when configured, on the NR backhaul links between IAB nodes or between IAB node and IAB Donor, or for multicast MTCHs.
  L: The Length field indicates the length of the corresponding MAC SDU or variable-sized MAC CE in bytes.

There is one L field per MAC subheader except for subheaders corresponding to fixed-sized MAC CEs, padding, and MAC SDUs containing UL CCCH. The size of the L field is indicated by the F field;

F: The Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field;

R: Reserved bit, set to 0.

The MAC subheader is octet aligned.

TABLE 6.2.1-1

Values of LCID for DL-SCH

| Codepoint/ Index | LCID values |
| --- | --- |
| 0 | CCCH |
| 1-32 | Identity of the logical channel of DCCH, DTCH and multicast MTCH |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

Quotation End

In 3GPP TS 38.300 ([4] 3GPP TS 38.300 V17.1.0 (2022-06), "3GPP TSG RAN; NR; NR and NG-RAN Overall Description; Stage 2 (Release 17)"), some quotations are shown as below.

Quotation Start 16.10 Multicast and Broadcast Services
16.10.1 General

NR system enables resource efficient delivery of multicast/broadcast services (MBS).

For broadcast communication service, the same service and the same specific content data are provided simultaneously to all UEs in a geographical area (i.e., all UEs in the broadcast service area are authorized to receive the data). A broadcast communication service is delivered to the UEs using a broadcast session. A UE can receive a broadcast communication service in RRC_IDLE, RRC_INACTIVE and RRC_CONNECTED state.

For multicast communication service, the same service and the same specific content data are provided simultaneously to a dedicated set of UEs (i.e., not all UEs in the multicast service area are authorized to receive the data). A multicast communication service is delivered to the UEs using a multicast session. A UE can receive a multicast communication service in RRC_CONNECTED state with mechanisms such as PTP and/or PTM delivery, as defined in clause 16.10.5.4. HARQ feedback/retransmission can be applied to both PTP and PTM transmission.

16.10.2 Network Architecture

The overall NG-RAN architecture specified in clause 4 applies for NR MBS. MBS multicast can only be supported in MCG side in NE-DC and NR-DC scenarios, i.e., only for MN-terminated MCG MRB; the configuration of MBS broadcast on SCG is not supported for the UE.

The QoS model for NR MBS can be found in TS 23.247 [45].

16.10.3 Protocol Architecture

FIGS. 16.10.3-1 and 16.10.3-2 depict the downlink Layer 2 architecture for multicast session and broadcast session respectively, where MBS protocol stack comprises the same layer 2 sublayers as described in clause 6 with the following differences:

SDAP sublayer provides only the following functionalities:

Mapping between an MBS QoS flow and an MRB;

Transfer of user plane data.

PDCP sublayer provides only the following functionalities:

Transfer of user plane data;

Maintenance of PDCP SNs;

Header compression and decompression using the ROHC protocol or EHC protocol;

Reordering and in-order delivery;

Duplicate discarding.

For a multicast session, gNB provides one or more of the following multicast MRB configuration(s) to the UE via dedicated RRC signalling:

Multicast MRB with DL only RLC-UM or bidirectional RLC-UM configuration for PTP transmission;

Multicast MRB with RLC-AM entity configuration for PTP transmission;

Multicast MRB with DL only RLC-UM entity for PTM transmission;

Multicast MRB with two RLC-UM entities, one DL only RLC-UM entity for PTP transmission and the other DL only RLC-UM entity for PTM transmission;

Multicast MRB with three RLC-UM entities, one DL RLC-UM entity and one UL RLC-UM entity for PTP transmission and the other DL only RLC-UM entity for PTM transmission;

Multicast MRB with two RLC entities, one RLC-AM entity for PTP transmission and the other DL only RLC-UM entity for PTM transmission.

For a multicast session, gNB may change the MRB type using RRC signalling.

Figure 5:
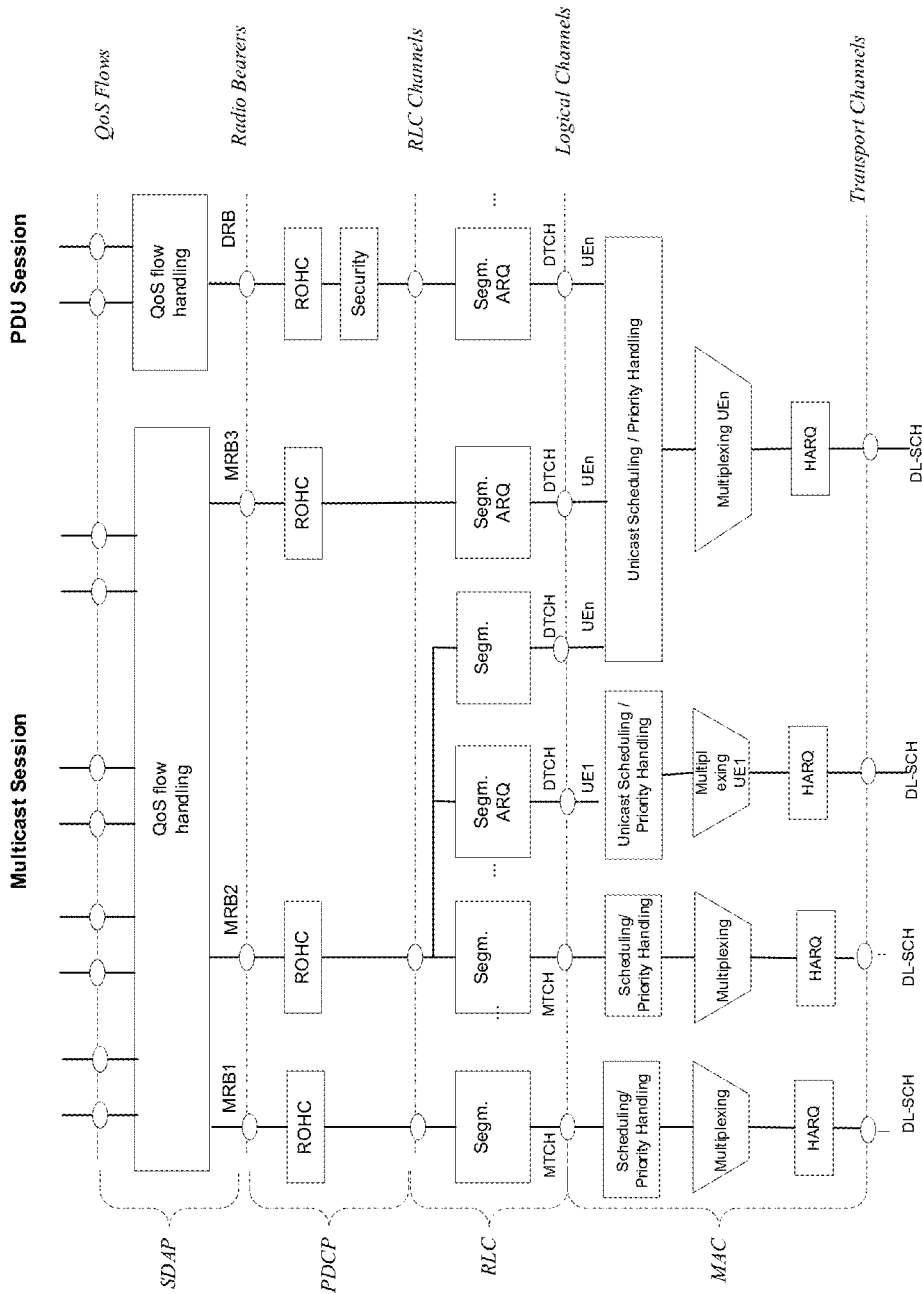
FIG. 5 is a reproduction of FIG. 16.10.3-1 of 3GPP TS 38.300 V17.1.0 (2022-06): Downlink Layer 2 Architecture for Multicast Session.

FIG. 5 is a Reproduction of FIG. 16.10.3-1: Downlink Layer 2 Architecture for Multicast Session.

For broadcast session, gNB provides the following broadcast MRB configuration to the UE using broadcast RRC signalling:

Broadcast MRB with one DL only RLC-UM entity for PTM transmission.

Figure 6:
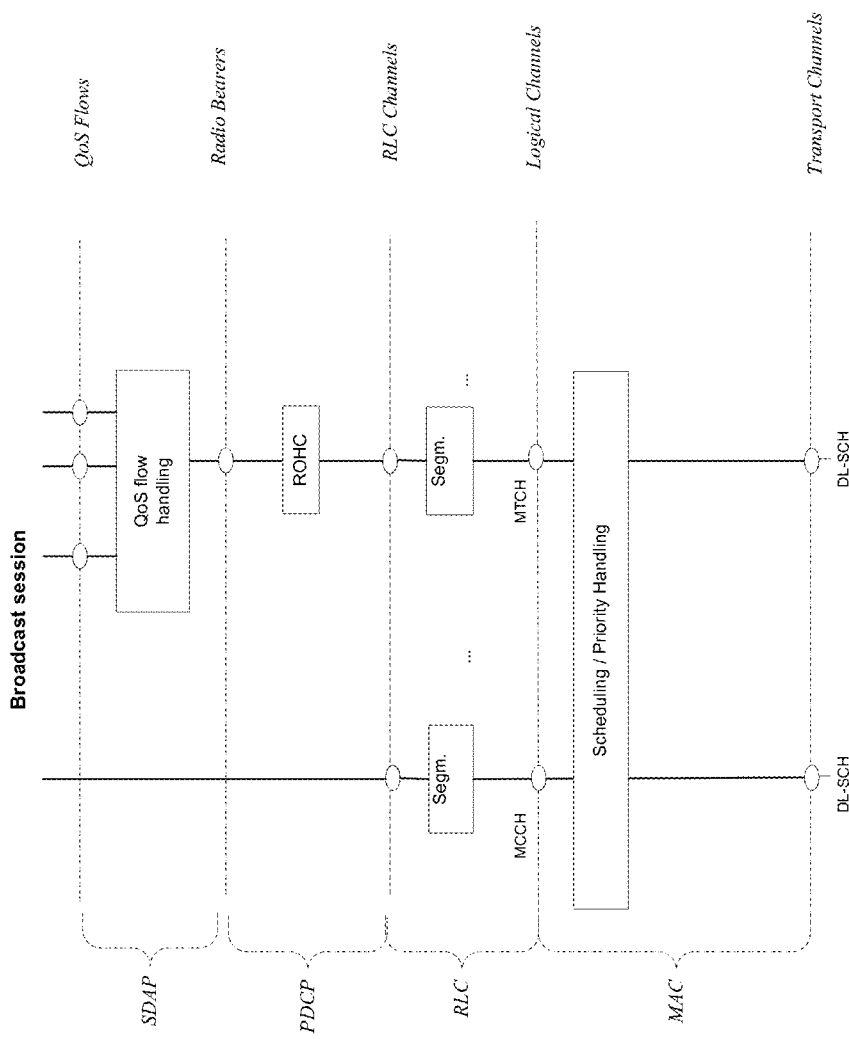
FIG. 6 is a reproduction of FIG. 16.10.3-2 of 3GPP TS 38.300 V17.1.0 (2022-06): Downlink Layer 2 Architecture for Broadcast Session.

FIG. 6 is a Reproduction of FIG. 16.10.3-2: Downlink Layer 2 Architecture for Broadcast Session.

16.10.4 Group Scheduling

The following logical channels are used for MBS delivery:

MTCH: A point-to-multipoint downlink channel for transmitting MBS data of either multicast session or broadcast session from the network to the UE;

DTCH: A point-to-point channel defined in clause 6.2.2 for transmitting MBS data of a multicast session from the network to the UE;

MCCH: A point-to-multipoint downlink channel used for transmitting MBS broadcast control information associated to one or several MTCH(s) from the network to the UE.

The following connections between logical channels and transport channels for group transmission exist:

MCCH can be mapped to DL-SCH;

MTCH can be mapped to DL-SCH.

The following depicts the usage of RNTI for group transmission:

A UE can receive different services using same or different G-RNTIs/G-CS-RNTIs.

16.10.5 Multicast Handling 16.10.5.1 Session Management

There are two delivery modes as specified in TS 23.247 [45]:

5GC Shared MBS traffic delivery;

5GC Individual MBS traffic delivery.

As specified in TS 23.247 [45], if the gNB supports MBS, the network shall use the 5GC Shared MBS traffic delivery in which case an MBS Session Resource context for a multicast session is setup in the gNB when the first UE joins the multicast session.

For MBS shared delivery mode, shared NG-U resources are used to provide MBS user data to the gNB. The gNB initiates the Multicast Distribution Setup procedure towards the 5GC, to allocate shared NG-U resources for a multicast session. In case multiple MBS session areas are associated with the same multicast session for location dependent MBS services, multiple NG-U shared resources are established for the same multicast session per MBS Area Session ID served by the gNB.

A shared NG-U resource applies one of the following transport options:

unicast transport;

multicast transport.

For 5GC Shared MBS traffic delivery an MBS Session Resource comprises one or several MRBs. If minimisation of data loss is applied for a given MRB, synchronisation of allocation of PDCP COUNT values is applied by either or a combination of the following methods:

derivation of the PDCP COUNT values by means of a DL MBS QFI Sequence Number provided on NG-U. Synchronisation in terms of MBS QoS flow to MRB mapping and PDCP SN size of the corresponding MRB among gNBs are achieved by means of network implementation.

deployment of a Shared NG-U Termination at NG-RAN, shared among gNBs, which comprises a common entity for assignment of PDCP COUNT values. Synchronisation in terms of MBS QoS flow to MRB mapping and PDCP SN size of the corresponding MRB among gNBs may be achieved by means of network implementation.

If PDCP COUNT values are derived from a DL MBS QFI Sequence Number provided on NG-U and only one QoS Flow is mapped to an MRB, the gNB shall set the PDCP COUNT value of PDCP PDU to the value of the DL MBS QFI Sequence Number provided with the received packet over NG-U. If PDCP COUNT values are derived from a DL MBS QFI Sequence Number provided on NG-U and multiple QoS Flows are mapped to an MRB, the gNB may derive the PDCP COUNT value of the PDCP PDU from the sum of the DL MBS QFI Sequence Numbers of the QoS Flows mapped to this MRB.

1. NOTE: Synchronisation of PDCP COUNT values in case user data for MBS QoS flows mapped to the same MRB arrive over NG-U at different gNBs in different order or in case of loss of data over NG-U, and related handling of minimisation of data loss is left to implementation.

16.10.5.4 Reception of MBS Multicast Data

For multicast service, gNB may deliver Multicast MBS data packets using the following methods:

PTP Transmission: gNB individually delivers separate copies of MBS data packets to each UEs independently, i.e., gNB uses UE-specific PDCCH with CRC scrambled by UE-specific RNTI (e.g., C-RNTI) to schedule UE-specific PDSCH which is scrambled with the same UE-specific RNTI.

PTM Transmission: gNB delivers a single copy of MBS data packets to a set of UEs, e.g., gNB uses group-common PDCCH with CRC scrambled by group-common RNTI to schedule group-common PDSCH which is scrambled with the same group-common RNTI.

If a UE is configured with both PTM and PTP transmissions, a gNB dynamically decides whether to deliver multicast data by PTM leg and/or PTP leg for a given UE based on the protocol stack defined in clause 16.10.3, based on information such as MBS Session QoS requirements, number of joined UEs, UE individual feedback on reception quality, and other criteria. The same QoS requirements apply regardless of the decision.

16.10.5.5 Support of CA

UE can receive MBS multicast data either from a PCell or a single SCell at a time.

16.10.5.6 DRX

The following DRX configurations for PTM/PTP transmission are possible:

For PTM transmission, multicast DRX is configured per G-RNTI/G-CS-RNTI which is independent of UE-specific DRX;

For PTP transmission, UE-specific DRX is reused, i.e., UE-specific DRX is used for both unicast transmission and PTP transmission of MBS multicast. For PTM retransmission via PTP, UE monitors PDCCH scrambled by C-RNTI/CS-RNTI during UE-specific DRX's Active Time.

16.10.5.7 Physical Layer

A common frequency resource configured by SRB is defined for multicast scheduling as an 'MBS frequency region' with a number of contiguous PRBs confined within and with the same numerology as the DL BWP, but multicast scheduling may have specific characteristics (e.g., PDCCH, PDSCH and SPS configurations).

Two HARQ-ACK reporting modes are defined for MBS:

For the first HARQ-ACK reporting mode, the UE generates HARQ-ACK information with ACK value when a UE correctly decodes a transport block or detects a DCI format indicating an SPS PDSCH release; otherwise, the UE generates HARQ-ACK information with NACK value.

For the second HARQ-ACK reporting mode, the UE does not transmit a PUCCH that would include only HARQ-ACK information with ACK values.

HARQ-ACK feedback for multicast can be enabled or disabled by higher layer configuration per G-RNTI or per G-CS-RNTI and/or indication in the DCI scheduling multicast transmission.

16.10.6 Broadcast Handling

Quotation End

In 3GPP TS 38.213 ([5] 3GPP TS 38.213 V17.2.0 (2022-06), "3GPP TSG RAN; NR; NR and NG-RAN Overall Description; Stage 2 (Release 17)"), some quotations are shown as below.

Quotation Start

18 Multicast Broadcast Services

This clause is applicable only for PDCCH receptions, PDSCH receptions, and PUCCH transmissions for MBS on a serving cell. DCI formats with CRC scrambled by G-RNTI or G-CS-RNTI scheduling PDSCH receptions are referred to as multicast DCI formats and the PDSCH receptions are referred to as multicast PDSCH receptions. DCI formats with CRC scrambled by MCCH-RNTI or G-RNTI for MTCH scheduling PDSCH receptions are referred to as broadcast DCI formats and the PDSCH receptions are referred to as broadcast PDSCH receptions. HARQ-ACK information associated with multicast DCI formats or multicast PDSCH receptions is referred to as multicast HARQ-ACK information.

A UE can be provided one or more G-RNTIs per serving cell for scrambling the CRC of multicast DCI formats for scheduling PDSCH receptions. The UE can be provided one or more G-CS-RNTI per serving cell for scrambling the CRC of multicast DCI formats providing activation/release for SPS PDSCH receptions.

A UE can be configured by cfr-Config-MCCH-MTCH an MBS frequency resource for PDCCH and PDSCH receptions providing MCCH and MTCH [12, TS 38.331]; otherwise, the MBS frequency resource is same as for the CORESET with index 0 that is associated with the Type0-PDCCH CSS set for PDCCH and PDSCH receptions providing MCCH and MTCH. A UE monitors PDCCH for scheduling PDSCH receptions for MCCH or MTCH as described in clause 10.1.

In clauses referring to a higher layer parameter value provided by PDCCH-Config Common or PDSCH-Config Common, when applicable a corresponding higher layer parameter value for MCCH/MTCH PDCCH receptions or PDSCH receptions, respectively, is provided as described in [12, TS 38.331].

A UE is not required to simultaneously receive PDSCHs for MCCH or MTCH on two serving cells. A UE is not required to simultaneously receive on a serving cell
  PDSCHs for MCCH and MTCH, or
  more than one MTCH PDSCHs, or
  PDSCH for MTCH and PBCH, or
  PDSCH for MCCH or MTCH and PDSCH scheduled by a DCI format 1_0 with CRC scrambled by SI-RNTI or by P-RNTI A UE in the RRC_CONNECTED state is not required to simultaneously receive on a serving cell
  PDSCHs for MCCH or MTCH and multicast PDSCH, or more than one multicast PDSCHs, or
  multicast PDSCH and PBCH, or
  PDSCH for MCCH or MTCH or multicast PDSCH and PDSCH scheduled by a DCI format 1_0 with CRC scrambled by RA-RNTI A UE can be configured, per DL BWP by cfr-Config-Multicast, an MBS frequency resource within the DL BWP for PDCCH and PDSCH receptions [4, TS 38.211]. If cfr-Config-Multicast does not include locationAndBandwidth-Multicast, the MBS frequency resource is the active DL BWP. The UE is not required to simultaneously receive PDSCHs on two serving cells. In clauses referring to a higher layer parameter value provided by PDCCH-Config or PDSCH-Config or SPS-Config for a DL BWP, when applicable a corresponding higher layer parameter value for multicast PDCCH, PDSCH, or SPS PDSCH receptions is provided as described in [12, TS 38.331].

In clauses referring to a higher layer parameter value provided by a first or second PUCCH-Config, when applicable a corresponding higher layer parameter value for PUCCH transmissions associated with multicast PDCCH or PDSCH receptions is provided as described in [12, TS 38.331]. In clauses referring to a higher layer parameter value provided by SPS-PUCCH-AN or SPS-PUCCH-AN-List, when applicable a corresponding higher layer parameter value for PUCCH transmissions associated with multicast SPS PDSCH receptions is provided as described in [12, TS 38.331]. In clauses referring to a higher layer parameter value provided by pdsch-HARQ-ACK-Codebook or pdsch-HARQ-ACK-CodebookList, when applicable a corresponding higher layer parameter value for HARQ-ACK codebooks associated with multicast HARQ-ACK information is provided as described in [12, TS 38.331].

A UE monitors PDCCH for scheduling PDSCH receptions or for activation/release of SPS PDSCH receptions for a corresponding SPS PDSCH configuration as described in clause 10.1.

A UE can be configured by harq-Feedback-Option-Multicast for a G-RNTI, or by sps-HARQ-Feedback-Option-Multicast for a G-CS-RNTI, to provide HARQ-ACK information for a transport block reception associated with the G-RNTI or with the G-CS-RNTI, respectively, according to the first HARQ-ACK reporting mode or according to the second HARQ-ACK reporting mode. The UE determines a priority for a PUCCH transmission with multicast HARQ-ACK information according to any HARQ-ACK reporting mode as described in clause 9 for a PUCCH transmission with unicast HARQ-ACK information.

For the first HARQ-ACK reporting mode, the UE generates HARQ-ACK information with ACK value when a UE correctly decodes a transport block or detects a DCI format indicating an SPS PDSCH release; otherwise, the UE generates HARQ-ACK information with NACK value, as described in clauses 9 and 9.1 through 9.3.

For the second HARQ-ACK reporting mode, the UE does not transmit a PUCCH that would include only HARQ-ACK information with ACK values. The second HARQ-ACK reporting mode is not applicable for the first SPS PDSCH reception after activation of SPS PDSCH receptions for a SPS configuration, or for DCI formats having associated HARQ-ACK information without scheduling a PDSCH reception.

For the second HARQ-ACK reporting mode, when a number of HARQ-ACK information bits is one, a UE transmits a PUCCH only when the HARQ-ACK information bit has NACK value. For a PUCCH resource associated with PUCCH format 0, the UE transmits the PUCCH as described in [4, TS 38.211] by obtaining $m_0$ as described for HARQ-ACK information in clause 9.2.3 and by setting $m_{cs}=0$. For a PUCCH resource associated with PUCCH format 1, the UE transmits the PUCCH as described in [4, TS 38.211] by setting b(0)=0.

For the second HARQ-ACK reporting mode and a UE configured with only one G-RNTI, the UE can be indicated by moreThanOneNackOnlyMode to provide the HARQ-ACK information bits in a PUCCH either according to the first HARQ-ACK reporting mode or by selecting a resource from a set of resources for the PUCCH transmission based on the values of the HARQ-ACK information bits as described in Table 18-1. The UE generates HARQ-ACK information bits for the second HARQ-ACK reporting mode according to a Type-2 HARQ-ACK codebook as described in clause 9.1.3.1.

If a UE is provided pucch-ConfigurationListMulticast1 or pucch-ConfigurationListMulticast2 for PUCCH transmissions with a priority value, the UE transmits a PUCCH with the priority value according to pucch-ConfigurationListMulticast1 or pucch-ConfigurationListMulticast2 for each G-RNTI or G-CS-RNTI that the UE provides associated HARQ-ACK information according to the first HARQ-ACK reporting mode or the second HARQ-ACK reporting mode, respectively. For HARQ-ACK information associated only with the second HARQ-ACK reporting mode, when the UE is provided moreThanOneNackOnlyMode and the UE provides the HARQ-ACK information according to the first HARQ-ACK reporting mode and in response to at least one DCI format detection, the UE determines a PUCCH resource from pucch-ConfigurationListMulticast1, if provided; otherwise, the UE determines a PUCCH resource from pucch-Config/pucch-ConfigurationList.

A PDSCH reception providing an initial transmission of a transport block is scheduled only by a multicast DCI format. For the first HARO-ACK reporting mode, a PDSCH reception providing a retransmission of the transport block can be scheduled either by a multicast DCI format using a same G-RNTI as the G-RNTI of the initial transmission of the transport block, or by a unicast DCI format using a C-RNTI [6, TS 38.214].

An activation for SPS PDSCH receptions using a G-CS-RNTI for a corresponding SPS PDSCH configuration is provided only by a multicast DCI format as described in clause 10.2 by replacing CS-RNTI with the G-CS-RNTI. A release for SPS PDSCH receptions using a G-CS-RNTI for a corresponding SPS PDSCH configuration is provided by a multicast DCI format as described in clause 10.2 by replacing CS-RNTI with the G-CS-RNTI, or by a DCI format with CRC scrambled by CS-RNTI.

For the first HARO-ACK reporting mode and for a transport block that a UE received in a SPS PDSCH, a PDSCH reception providing a retransmission of the transport block can be scheduled either by a unicast DCI format using a CS-RNTI or by a multicast DCI format using a same G-CS-RNTI as the G-CS-RNTI of the initial transmission of the transport block [6, TS 38.214].

A UE can be configured per G-RNTI or per G-CS-RNTI, by harq-FeedbackEnablerMulticast with value set to 'enabled', to provide HARQ-ACK information for PDSCH receptions. When the UE is not provided harq-FeedbackEnablerMulticast for a G-RNTI or G-CS-RNTI, or when the UE is provided harq-FeedbackEnablerMulticast with value set to 'disabled', the UE does not provide HARQ-ACK information for respective PDSCH receptions. If a UE is provided harq-FeedbackEnablerMulticast with value set to 'dci-enabler' for a G-RNTI or a G-CS-RNTI, the UE determines whether or not to provide the HARQ-ACK information for PDSCH receptions based on an indication by the multicast DCI format associated with the G-RNTI or the G-CS-RNTI [4, TS 38.212].

If a UE would multiplex multicast HARQ-ACK information according to the second HARQ-ACK reporting mode with multicast HARQ-ACK information according to the first HARQ-ACK reporting mode, or unicast HARQ-ACK information, or CSI reports in a first PUCCH or in a PUSCH, as described in clauses 9 and 9.2.5, the UE provides the HARQ-ACK information according to the first HARQ-ACK reporting mode. For resolving an overlapping among a second PUCCH with HARQ-ACK information according to the second HARQ-ACK reporting mode and other PUCCHs or PUSCHs prior to multiplexing the HARQ-ACK information in a PUCCH or PUSCH, the UE considers that the UE would transmit the second PUCCH when all values of the HARQ-ACK information are 'ACK'.

If a UE is provided multiple G-RNTIs or G-CS-RNTIs, a configuration for a HARQ-ACK codebook type applies to all G-RNTIs or G-CS-RNTIs.

Quotation End

In 3GPP TS 38.331 ([6] 3GPP TS 38.331 V17.1.0 (2022-06), "3GPP TSG RAN; NR; Radio Resource Control (RRC) protocol specification (Release 17)"), some quotations are shown as below.

Quotation Start

MAC-CellGroupConfig
The IE MAC-CellGroupConfig is used to configure MAC parameters for a cell group, including DRX.
MAC-CellGroupConfig Information Element

```
-- ASN1START
-- TAG-MAC-CELLGROUPCONFIG-START
MAC-CellGroupConfig ::=           SEQUENCE {
    drx-Config                        SetupRelease { DRX-Config }
    OPTIONAL,  -- Need M
    schedulingRequestConfig           SchedulingRequestConfig
    OPTIONAL,  -- Need M
    bsr-Config                        BSR-Config
    OPTIONAL,  -- Need M
    tag-Config                        TAG-Config
    OPTIONAL,  -- Need M
    phr-Config                        SetupRelease { PHR-Config }
    OPTIONAL,  -- Need M
    skipUplinkTxDynamic               BOOLEAN,
    ...,
```

```
    [[
    csi-Mask                              BOOLEAN
OPTIONAL,    -- Need M
    dataInactivityTimer                   SetupRelease { DataInactivityTimer }
OPTIONAL    -- Cond MCG-Only
    ]],
    [[
    usePreBSR-r16                         ENUMERATED {true}
OPTIONAL,    -- Need R
    schedulingRequestID-LBT-SCell-r16     SchedulingRequestId
OPTIONAL,    -- Need R
    lch-BasedPrioritization-r16           ENUMERATED {enabled}
OPTIONAL,    -- Need R
    schedulingRequestID-BFR-SCell-r16     SchedulingRequestId
OPTIONAL,    -- Need R
    drx-ConfigSecondaryGroup-r16          SetupRelease { DRX-ConfigSecondaryGroup }
OPTIONAL    -- Need M
    ]],
    [[
    enhancedSkipUplinkTxDynamic-r16       ENUMERATED {true}
OPTIONAL,    -- Need R
    enhancedSkipUplinkTxConfigured-r16    ENUMERATED {true}
OPTIONAL    -- Need R
    ]],
    [[
    intraCG-Prioritization-r17            ENUMERATED {enabled}          OPTIONAL,    -- Cond
LCH-PrioWithReTxTimer
    drx-ConfigSL-r17                      SetupRelease { DRX-ConfigSL-r17 }    OPTIONAL,    -- Need M
    drx-ConfigExt-v1700                   SetupRelease { DRX-ConfigExt-v1700 } OPTIONAL,    -- Need M
    schedulingRequestID-BFR-r17           SchedulingRequestId                  OPTIONAL,    -- Need R
    schedulingRequestID-BFR2-r17          SchedulingRequestId                  OPTIONAL,    -- Need R
    schedulingRequestConfig-v1700         SchedulingRequestConfig-v1700        OPTIONAL,    -- Need M
    tar-Config-r17                        SetupRelease { TAR-Config-r17 }
OPTIONAL,    -- Need M
    g-RNTI-ConfigToAddModList-r17         SEQUENCE (SIZE (1..maxG-RNTI-r17)) OF MBS-RNTI-SpecificConfig-r17
OPTIONAL,    -- Need N
    g-RNTI-ConfigToReleaseList-r17        SEQUENCE (SIZE (1..maxG-RNTI-r17)) OF MBS-RNTI-SpecificConfigId-
r17        OPTIONAL,    -- Need N
    g-CS-RNTI-ConfigToAddModList-r17      SEQUENCE (SIZE (1..maxG-CS-RNTI-r17)) OF MBS-RNTI-SpecificConfig-
r17        OPTIONAL,    -- Need N
    g-CS-RNTI-ConfigToReleaseList-r17     SEQUENCE (SIZE (1..maxG-CS-RNTI-r17)) OF MBS-RNTI-
SpecificConfigId-r17   OPTIONAL,          -- Need N
    allowCSI-SRS-Tx-MulticastDRX-Active-r17   BOOLEAN
OPTIONAL    -- Need M
    ]]
}
DataInactivityTimer ::=          ENUMERATED {s1, s2, s3, s5, s7, s10, s15, s20, s40, s50, s60, s80, s100,
s120, s150, s180}
MBS-RNTI-SpecificConfig-r17 ::=         SEQUENCE {
    mbs-RNTI-SpecificConfigId-r17                    MBS-RNTI-SpecificConfigId-r17,
    groupCommon-RNTI-r17                             CHOICE {
        g-RNTI                                           RNTI-Value,
        g-CS-RNTI                                        RNTI-Value
    },
    drx-ConfigPTM-r17                                SetupRelease { DRX-ConfigPTM-r17 }
OPTIONAL,    -- Need M
    harq-FeedbackEnablerMulticast-r17                ENUMERATED {dci-enabler, enabled}
OPTIONAL,    -- Need S
    harq-FeedbackOptionMulticast-r17                 ENUMERATED {ack-nack, nack-only}
OPTIONAL,    -- Cond HARQFeedback
    pdsch-AggregationFactorMulticast-r17             ENUMERATED {n2, n4, n8}
OPTIONAL    -- Cond G-RNTI
}
MBS-RNTI-SpecificConfigId-r17 ::= INTEGER (0..maxG-RNTI-1-r17)
-- TAG-MAC-CELLGROUPCONFIG-STOP
-- ASN1STOP
```

| MAC-CellGroupConfig field descriptions |
|---|
| allowCSI-SRS-Tx-MulticastDRX-Active |
| Used to control the CSI/SRS transmission during MBS multicast DRX ActiveTime, see TS 38.321 [3]. |
| csi-Mask |
| If set to true, the UE limits CSI reports to the on-duration period of the DRX cycle, see TS 38.321 [3]. |
| dataInactivityTimer |
| Releases the RRC connection upon data inactivity as specified in clause 5.3.8.5 and in TS 38.321 [3]. Value s1 corresponds to 1 second, value s2 corresponds to 2 seconds, and so on. |

| MAC-CellGroupConfig field descriptions |
|---|
| drx-Config, drx-ConfigExt<br>Used to configure DRX as specified in TS 38.321 [3]. Network only configures drx-ConfigExt when drx-Config is configured.<br>drx-ConfigSecondaryGroup<br>Used to configure DRX related parameters for the second DRX group as specified in TS 38.321 [3]. The network does not configure secondary DRX group with DCP simultaneously nor secondary DRX group with a dormant BWP simultaneously.<br>drx-ConfigSL<br>Used to configure additional DRX parameters for the UE performing sidelink operation with resource allocation mode 1, as specified in TS 38.321 [3]. Network only configures this field if sl-ScheduledConfig is configured and drx-Config is configured<br>g-RNTI-ConfigToAddModList<br>List of G-RNTI configurations to add or modify.<br>g-RNTI-ConfigToReleaseList<br>List of G-RNTI configurations to release.<br>g-CS-RNTI-ConfigToAddModList<br>List of G-CS-RNTI configurations to add or modify.<br>g-CS-RNTI-ConfigToReleaseList<br>List of G-CS-RNTI configurations to release.<br>intraCG-Prioritization<br>Used to enable HARQ process ID selection based on LCH-priority for one CG as specified in TS 38.321 [3].<br>lch-BasedPrioritization<br>If this field is present, the corresponding MAC entity of the UE is configured with prioritization between overlapping grants and between scheduling request and overlapping grants based on LCH priority, see TS 38.321 [3]. The network does not configure lch-BasedPrioritization with enhancedSkipUplinkTxDynamic simultaneously nor lch-BasedPrioritization with enhancedSkipUplinkTxConfigured simultaneously.<br>schedulingRequestID-BFR-SCell<br>Indicates the scheduling request configuration applicable for BFR on SCell, as specified in TS 38.321 [3].<br>schedulingRequestID-BFR-r17<br>Indicates the scheduling request configuration (SchedulingRequestConfig) that the UE shall use upon detecting a beam failure on the detection resources configured in BFDset of a serving cell but not on resources configured in BFDset2 of the same serving cell.<br>Editor's note: BFDset and BFDset2 configuration is pending on LS response from RAN1.<br>schedulingRequestID-BFR2-r17<br>Indicates the scheduling request configuration (SchedulingRequestConfig) that the UE shall use upon detecting a beam failure on the detection resources configured in BFDset2 of a serving cell but not on resources configured in BFDset of the same serving cell.<br>Editor's note: BFDset and BFDset2 configuration is pending on LS response from RAN1.<br>schedulingRequestID-LBT-SCell<br>Indicates the scheduling request configuration applicable for consistent uplink LBT recovery on SCell, as specified in TS 38.321 [3].<br>skipUplinkTxDynamic, enhancedSkipUplinkTxDynamic, enhancedSkipUplinkTxConfigured<br>If set to true, the UE skips UL transmissions as described in TS 38.321 [3]. If the UE is configured with enhancedSkipUplinkTxDynamic or enhancedSkipUplinkTxConfigured with value true, REPETITION_NUMBER (as specified in TS 38.321 [3], clause 5.4.2.1) of the corresponding PUSCH transmission of the uplink grant shall be equal to 1.<br>tag-Config<br>The field is used to configure parameters for a time-alignment group. The field is not present if any DAPS bearer is configured.<br>usePreBSR<br>If set to true, the MAC entity of the IAB-MT may use the Pre-emptive BSR, see TS 38.321 [3]. |

| MBS-RNTI-SpecificConfig field descriptions |
|---|
| drx-ConfigPTM<br>Used to configure DRX for PTM transmission as specified in TS 38.321 .<br>g-CS-RNTI<br>Used to scramble the SPS group-common PDSCH and activation/deactivation of SPS group-common PDSCH for one or more MBS multicast services.<br>g-RNTI<br>Used to scramble the scheduling and transmission of PTM for one or more MBS multicast services.<br>groupCommon-RNTI<br>Used to configure g-RNTI or g-CS-RNTI.<br>harq-FeedbackEnablerMulticast<br>Indicates whether the UE shall provide HARQ feedback for MBS multicast. Value dci-enabler means that whether the UE shall provide HARQ feedback for MBS multicast is indicated by DCI. Value enabled means the UE shall always provide HARQ feedback for MBS multicast. When the field is absent, the value "disabled" is used as defined in TS 38.213 [3].<br>harq-FeedbackOptionMulticast<br>Indicates the feedback mode for MBS multicast dynamically scheduled PDSCH or SPS PDSCH.<br>mbs-RNTI-SpecificConfigId<br>An identifier of the RNTI specific configuration for MBS multicast.<br>pdsch-AggregationFactorMulticast<br>Number of repetitions for dynamically scheduled MBS multicast data (see TS 38.214 [19], clause 5.1.2.1). When the field is absent and groupCommon-RNTI is set to g-RNTI, the UE applies the value 1. |

| MBS-RNTI-SpecificConfig field descriptions | |
|---|---|
| Conditional Presence | Explanation |
| G-RNTI | This field is optionally present, Need S, if groupCommon-RNTI is set to g-RNTI. The field is absent when groupCommon-RNTI is set to g-CS-RNTI. |
| HARQFeedback | The field is mandatory present when harq-FeedbackEnablerMulticast is present. It is absent otherwise. |
| MCG-Only | This field is optionally present, Need M, for the MAC-CellGroupConfig of the MCG. It is absent otherwise. |
| LCH-PrioWithReTxTimer | This field is optionally present, Need R, if lch-BasedPrioritization-r16 is configured in this MAC entity and cg-Retransmission Timer-r16 is configured for any configured grant configuration associated with this MAC entity. It is absent otherwise, Need R. |

BWP-DownlinkDedicated

The IE BWP-DownlinkDedicated is used to configure the dedicated (UE specific) parameters of a downlink BWP.

BWP-DownlinkDedicated Information Element

```
-- ASN1START
-- TAG-BWP-DOWNLINKDEDICATED-START
BWP-DownlinkDedicated ::=         SEQUENCE {
    pdcch-Config                      SetupRelease { PDCCH-Config }
OPTIONAL,   -- Need M
    pdsch-Config                      SetupRelease { PDSCH-Config }
OPTIONAL,   -- Need M
    sps-Config                        SetupRelease { SPS-Config }
OPTIONAL,   -- Need M
    radioLinkMonitoringConfig         SetupRelease { RadioLinkMonitoringConfig }
OPTIONAL,   -- Need M
    ...,
    [[
    sps-ConfigToAddModList-r16        SPS-ConfigToAddModList-r16
OPTIONAL,   -- Need N
    sps-ConfigToReleaseList-r16       SPS-ConfigToReleaseList-r16
OPTIONAL,   -- Need N
    sps-ConfigDeactivationStateList-r16   SPS-ConfigDeactivationStateList-r16
OPTIONAL,   -- Need R
    beamFailureRecoverySCellConfig-r16    SetupRelease {BeamFailureRecoveryRSConfig-r16}
OPTIONAL,   -- Cond SCellOnly
    sl-PDCCH-Config-r16               SetupRelease { PDCCH-Config }
OPTIONAL,   -- Need M
    sl-V2X-PDCCH-Config-r16           SetupRelease { PDCCH-Config }
OPTIONAL    -- Need M
    ]],
    [[
    preConfGapStatus-r17              BIT STRING (SIZE (maxNrofGapId-r17))
OPTIONAL,   -- Cond PreConfigMG
    beamFailureRecoverySpCellConfig-r17   SetupRelease { BeamFailureRecoveryRSConfig-r16}
OPTIONAL,   -- Cond SpCellOnly
    harq-FeedbackEnablingforSPSactive-r17 BOOLEAN
OPTIONAL,   -- Need R
    cfr-ConfigMulticast-r17           SetupRelease { CFR-ConfigMulticast-r17 }
OPTIONAL,   -- Need M
    dl-PPW-PreConfigToAddModList-r17  DL-PPW-PreConfigToAddModList-r17
OPTIONAL,   -- Need N
    dl-PPW-PreConfigToReleaseList-r17 DL-PPW-PreConfigToReleaseList-r17
OPTIONAL,   -- Need N
    nonCellDefiningSSB-r17            NonCellDefiningSSB-r17
OPTIONAL,   -- Need R
    servingCellMO-r17                 MeasObjectId
OPTIONAL -- Cond MeasObject-NCDSSB
    ]]
}
SPS-ConfigToAddModList-r16 ::=        SEQUENCE (SIZE (1..maxNrofSPS-Config-r16)) OF SPS-Config
SPS-ConfigToReleaseList-r16 ::=       SEQUENCE (SIZE (1..maxNrofSPS-Config-r16)) OF SPS-ConfigIndex-r16
SPS-ConfigDeactivationState-r16 ::=   SEQUENCE (SIZE (1..maxNrofSPS-Config-r16)) OF SPS-ConfigIndex-r16
SPS-ConfigDeactivationStateList-r16 ::= SEQUENCE (SIZE (1..maxNrofSPS-DeactivationState)) OF SPS-ConfigDeactivationState-r16
DL-PPW-PreConfigToAddModList-r17 ::=  SEQUENCE (SIZE (1..maxNrofPPW-Config-r17)) OF DL-PPW-PreConfig-r17
DL-PPW-PreConfigToReleaseList-r17 ::= SEQUENCE (SIZE (1..maxNrofPPW-Config-r17)) OF DL-PPW-ID-r17
-- TAG-BWP-DOWNLINKDEDICATED-STOP
-- ASN1STOP
```

| BWP-DownlinkDedicated field descriptions |
| --- | beamFailureRecoverySCellConfig
Configuration of candidate RS for beam failure recovery in SCells.
beamFailureRecoverySpCellConfig
Configuration of candidate RS for beam failure recovery in SpCells.
cfr-ConfigMulticast
UE specific common frequency resource configuration for MBS multicast for one dedicated BWP. This field can be configured within at most one serving cell.
dl-PPW-PreConfigToAddModList
Indicates a list of DL-PRS processing window configurations to be added or modified for the dedicated DL BWP.
dl-PPW-PreConfigToReleaseList
Indicates a list of DL-PRS processing window configurations to be released for the dedicated DL BWP.
harq-FeedbackEnablingforSPSactive
If enabled, UE reports ACK/NACK for the first SPS PDSCH after activation, regardless of if HARQ feedback is enabled or disabled corresponding to the first SPS PDSCH after activation. Otherwise, UE follows configuration of HARQ feedback enabled/disabled corresponding to the first SPS PDSCH after activation.
nonCellDefiningSSB-r17
If configured, the RedCap UE operating in this BWP uses this SSB for the purposes for which it would otherwise have used the cell-defining SSB of the serving cell (e.g. obtaining sync, measurements, RLM). Furthermore, other parts of the BWP configuration that refer to an SSB (e.g. the "SSB" configured in the QCL-Info IE; the "ssb-Index" configured in the RadioLinkMonitoringRS; CFRA-SSB-Resource; PRACH-ResourceDedicatedBFR) refer implicitily to this NCD-SSB.
The NCD-SSB has the same values for the properties (e.g., ssb-PositionsinBurst, PCI, ssb-periodicity, ssb-PBCH-BlockPower) of the corresponding CD-SSB apart from the values of the properties configured in the NonCellDefiningSSB-r17 IE.
pdcch-Config
UE specific PDCCH configuration for one BWP.
pdsch-Config
UE specific PDSCH configuration for one BWP.
preConfGapStatus
Indicates whether the pre-configured measurement gaps (i.e. the gaps configured with preConfigInd) are activated or deactivated upon the switch to this BWP. If this field is configured, the UE shall apply network-controlled mechanism for activation and deactivation of the pre-configured measurement gaps, otherwise the UE shall apply the autonomous activation/deactivation mechanism, as specified in TS 38.133 [14]. The first/leftmost bit corresponds to the measurement gap with gap ID 1, the second bit corresponds to measurement gap with gap ID 2, and so on. Value 0 indicates that the corresponding pre-configured measurement gap is deactivated while value 1 indicates that the corresponding pre-configured measurement gap is activated. The UE shall ignore the bit if the corresponding measurement gap is not a pre-configured measurement gap.
serving CellMO
measObjectId of the MeasObjectNR in MeasConfig which is associated to the serving cell. For this MeasObjectNR, the following relationship applies between this MeasObjectNR and nonCellDefiningSSB in BWP-DownlinkDedicated of the associated downlink BWP: if ssbFrequency is configured, its value is the same as the absoluteFrequencySSB in the nonCellDefiningSSB. If the field is present in a downlink BWP and the BWP is activated, the RedCap UE uses this measurement object for serving cell measurements, otherwise, the RedCap UE uses the servingCellMO in ServingCellConfig IE.
sps-Config
UE specific SPS (Semi-Persistent Scheduling) configuration for one BWP. Except for reconfiguration with sync, the NW does not reconfigure sps-Config when there is an active configured downlink assignment (see TS 38.321 [3]). However, the NW may release the sps-Config at any time. Network can only configure SPS in one BWP using either this field or sps-ConfigToAddModList.
sps-ConfigDeactivationStateList
Indicates a list of the deactivation states in which each state can be mapped to a single or multiple SPS configurations to be deactivated, see clause 10.2 in TS 38.213 [13]. If a state is mapped to multiple SPS configurations, each of these SPS configurations is configured with the same harq-CodebookID.
sps-ConfigToAddModList
Indicates a list of one or more DL SPS configurations to be added or modified in one BWP. Except for reconfiguration with sync, the NW does not reconfigure a SPS configuration when it is active (see TS 38.321 [3]).
sps-ConfigToReleaseList
Indicates a list of one or more DL SPS configurations to be released. The NW may release a SPS configuration at any time.
radioLinkMonitoringConfig
UE specific configuration of radio link monitoring for detecting cell- and beam radio link failure occasions. The maximum number of failure detection resources should be limited up to 8 for both cell and beam radio link failure detection. For SCells, only periodic 1-port CSI-RS can be configured in IE RadioLinkMonitoringConfig.
sl-PDCCH-Config
Indicates the UE specific PDCCH configurations for receiving the SL grants (via SL-RNTI or SL-CS-RNTI) for NR sidelink communication.
sl-V2X-PDCCH-Config
Indicates the UE specific PDCCH configurations for receiving SL grants (i.e. sidelink SPS) for V2X sidelink communication.

| Conditional Presence | Explanation |
|---|---|
| MeasObject-NCD-SSB | This field is optionally present Need S if the UE is a RedCap UE and nonCellDefiningSSB is configured in this DL BWP. It is absent otherwise. |
| PreConfigMG | The field is optionally present, Need R, if there is at least one per UE gap configured with preConfigInd or there is at least one per FR gap of the same FR which the BWP belongs to and configured with preConfigInd. It is absent, Need R, otherwise. |
| ScellOnly | The field is optionally present, Need M, in the BWP-DownlinkDedicated of an Scell. It is absent otherwise. |
| SpCellOnly | The field is optionally present, Need M, in the BWP-DownlinkDedicated of an Spcell. It is absent otherwise. |

CFR-ConfigMulticast

The IE CFR-ConfigMulticast indicates UE specific common frequency resource configuration for multicast for one dedicated BWP.

CFR-ConfigMulticast Information Element

```
-- ASN1START
-- TAG-CFR-CONFIGMULTICAST-START
CFR-ConfigMulticast-r17::= SEQUENCE {
    locationAndBandwidthMulticast-r17       INTEGER (0..37949)                          OPTIONAL, -- Need S
    pdcch-ConfigMulticast-r17               PDCCH-Config                                OPTIONAL, -- Need M
    pdsch-ConfigMulticast-r17               PDSCH-Config                                OPTIONAL, -- Need M
    sps-ConfigMulticastToAddModList-r17     SPS-ConfigMulticastToAddModList-r17         OPTIONAL, -- Need N
    sps-ConfigMulticastToReleaseList-r17    SPS-ConfigMulticastToReleaseList-r17        OPTIONAL  -- Need N
}
SPS-ConfigMulticastToAddModList-r17 ::= SEQUENCE (SIZE (1..8)) OF SPS-Config
SPS-ConfigMulticastToReleaseList-r17 ::= SEQUENCE (SIZE (1..8)) OF SPS-ConfigIndex-r16
-- TAG-CFR-CONFIGMULTICAST-STOP
-- ASN1STOP
```

| CFR-ConfigMulticast field descriptions |
|---|
| locationAndBandwidthMulticast |
| Frequency domain location and bandwidth for MBS multicast. The value of the field shall be interpreted as resource indicator value (RIV) as defined TS 38.214 [19] with assumptions as described in TS 38.213 [13], clause 12, i.e. setting N˜size_BWP = 275. The first PRB is a PRB determined by subcarrierSpacing of the associated BWP and offsetToCarrier corresponding to this subcarrier spacing. If not configured, the UE applies the value of locationAndBandwidth of the DL BWP in which the cfr-ConfigMulticast is configured. |
| pdcch-ConfigMulticast |
| UE specific group-common PDCCH configuration for MBS multicast for one CFR. |
| pdsch-ConfigMulticast |
| UE specific group-common PDSCH configuration for MBS multicast for one CFR. |

-continued

| CFR-ConfigMulticast field descriptions |
|---|
| sps-ConfigMulticastToAddModList |
| Indicates a list of one or more DL SPS configurations for MBS multicast. |
| sps-ConfigMulticastToReleaseList |
| Indicates a list of one or more DL SPS configurations to be released. The NW may release a SPS configuration at any time. |

SPS-Config

The IE SPS-Config is used to configure downlink semi-persistent transmission. Multiple Downlink SPS configurations may be configured in one BWP of a serving cell.

SPS-Config Information Element

```
-- ASN1START
-- TAG-SPS-CONFIG-START
SPS-Config ::=              SEQUENCE {
    periodicity             ENUMERATED {ms10, ms20, ms32, ms40, ms64, ms80, ms128, ms160, ms320, ms640,
                                        spare6, spare5, spare4, spare3, spare2, spare1},
    nrofHARQ-Processes      INTEGER (1..8),
    n1PUCCH-AN              PUCCH-ResourceId                                OPTIONAL,   -- Need M
    mcs-Table               ENUMERATED {qam64LowSE}                         OPTIONAL,   -- Need S
    ...,
```

```
[[
sps-ConfigIndex-r16              SPS-ConfigIndex-r16
    OPTIONAL,  -- Cond SPS-List
harq-ProcID-Offset-r16           INTEGER (0..15)
    OPTIONAL,  -- Need R
periodicityExt-r16               INTEGER (1..5120)
    OPTIONAL,  -- Need R
harq-CodebookID-r16              INTEGER (1..2)
    OPTIONAL,  -- Need R
pdsch-AggregationFactor-r16      ENUMERATED {n1, n2, n4, n8 }
    OPTIONAL   -- Need S
]],
[[
sps-HARQ-Deferral-r17            INTEGER (1..32)
    OPTIONAL,  -- Need R
n1PUCCH-AN-PUCCHsSCell-r17       PUCCH-ResourceId
    OPTIONAL,  -- Need R
periodicityExt-r17               INTEGER (1..40960)
    OPTIONAL,  -- Need R
nrofHARQ-Processes-v1710         INTEGER (9..32)
    OPTIONAL,  -- Need R
harq-ProcID-Offset-v1700         INTEGER (16..31)
    OPTIONAL   -- Need R
]]
}
-- TAG-SPS-CONFIG-STOP
-- ASN1STOP
```

| SPS-Config field descriptions |
| --- |
| harq-CodebookID |
| Indicates the HARQ-ACK codebook index for the corresponding HARQ-ACK codebook for SPS PDSCH and ACK for SPS PDSCH release. |
| harq-ProcID-Offset |
| Indicates the offset used in deriving the HARQ process IDs, see TS 38.321 [3], clause 5.3.1. |
| mcs-Table |
| Indicates the MCS table the UE shall use for DL SPS (see TS 38.214 [19], clause 5.1.3.1. If present, the UE shall use the MCS table of low-SE 64QAM table indicated in Table 5.1.3.1-3 of TS 38.214 [19]. If this field is absent and field mcs-table in PDSCH-Config is set to 'qam256' and the activating DCI is of format 1_1, the UE applies the 256QAM table indicated in Table 5.1.3.1-2 of TS 38.214 [19]. If this field is absent and the field mcs-Table-r17 in PDSCH-Config is set to 'qam1024' and the activating DCI is format 1_1, the UE applies the 1024QAM table indicated in Table 5.1.3.1-4 of TS 38.214 [19]. Otherwise, the UE applies the non-low-SE 64QAM table indicated in Table 5.1.3.1-1 of TS 38.214 [19]. |
| n1PUCCH-AN |
| HARQ resource for PUCCH for DL SPS. The network configures the resource either as format0 or format1. The actual PUCCH-Resource is configured in PUCCH-Config and referred to by its ID. See TS 38.213 [13], clause 9.2.3. |
| n1PUCCH-AN-PUCCHsSCell |
| HARQ resource for PUCCH on PUCCH switching SCell (sSCell) for DL SPS. The network configures the resource either as format 0 or format 1. The actual PUCCH-Resource is configured in PUCCH-Config of the PUCCH sSCell and referred to by its ID. See TS 38.213 [13], clause 9.2.3. |
| nrofHARQ-Processes |
| Number of configured HARQ processes for SPS DL (see TS 38.321 [3], clause 5.8.1). If UE is configured with nrofHARQ-Processes-v1710 UE shall ignore nrofHARQ-Processes (without suffix). |
| pdsch-AggregationFactor |
| Number of repetitions for SPS PDSCH (see TS 38.214 [19], clause 5.1.2.1). When the field is absent, the UE applies PDSCH aggregation factor of PDSCH-Config. |
| periodicity |
| Periodicity for DL SPS (see TS 38.214 [19] and TS 38.321 [3], clause 5.8.1). |
| periodicityExt |
| This field is used to calculate the periodicity for DL SPS (see TS 38.214 [19] and see TS 38.321 [3], clause 5.8.1). If this field is present, the field periodicity is ignored. |
| The following periodicities are supported depending on the configured subcarrier spacing [ms]: |
| 15 kHz: periodicityExt, where periodicityExt has a value between 1 and 640. |
| 30 kHz: 0.5 × periodicityExt, where periodicityExt has a value between 1 and 1280. |
| 60 kHz with normal CP: 0.25 × periodicityExt, where periodicityExt has a value between 1 and 2560. |
| 60 kHz with ECP: 0.25 × periodicityExt, where periodicityExt has a value between 1 and 2560. |
| 120 kHz: 0.125 × periodicityExt, where periodicityExt has a value between 1 and 5120. |
| 480 kHz: 0.0625 × periodicityExt, where periodicityExt has a value between 1 and 20480. |
| 960 kHz: 0.03125 × periodicityExt, where periodicityExt has a value between 1 and 40960. |
| periodicityExt-r17 is only applicable for SCS 480 kHz and 960 kHz. |
| sps-ConfigIndex |
| Indicates the index of one of multiple SPS configurations. |

-continued

SPS-Config field descriptions sps-HARQ-Deferral
Indicates the maximum number of slots or subslots the transmission of DL SPS HARQ-ACK in a slot or subslot can be deferred
(see TS 38.213 [13], clause 9.2.5.4).

| Conditional Presence | Explanation |
|---|---|
| SPS-List | The field is mandatory present when included in sps-ConfigToAddModList-r16, otherwise the field is absent. |

Quotation End

In R2-2209656 ([7] R2-2209656 "Clarifications on DRX and HARQ buffer handling" Huawei, CBN, HiSilicon), some quotations are shown as below.

Quotation Start 2.2 Unnecessary start of drx-HARQ-RTT-TimerDL in case UE does not support PTP retransmission
In previous RAN2 meetings, the following agreement was reached.

RAN2#116bis e-meeting agreement:
- In PTP for PTM retransmission, the UE monitors UE specific PDCCH/C-RNTI only during unicast DRX's active time. Unicast DRX's RTT timer can be started when PTP retransmission is expected.

However, in the current specification, the highlighted part is not reflected. In addition, for PTM retransmission via C-RNTI, RAN1 defines two optional UE capability: 33-2d (PTP retransmission for multicast dynamic scheduling) and 33-5-1d (PTP retransmission for SPS group-common PDSCH for multicast).

According to the current specification, even if UE does not support PTM retransmission via C-RNTI, the UE still start drx-HARQ-RTT-TimerDL for the corresponding HARQ process after receiving a PTM transmission, which will cause UE power waste.

Therefore, we propose RAN2 to clarify that UE doesn't need to start drx-HARQ-RTT-TimerDL for the corresponding HARQ process after receiving a PTM transmission if UE does not support PTM retransmission via C-RNTI.

Proposal 3: Clarify that the UE doesn't need to start drx-HARQ-RTT-TimerDL after receiving a PTM transmission if the UE does not support PTM retransmission via C-RNTI.

Quotation End

Issues and Solutions:
Assume that Discontinuous Reception (DRX) (pattern/configuration) is associated with a Group (G)-Radio Network Temporary Identifier (RNTI) or G-Configured Scheduling (CS)-RNTI, which may correspond to a multicast service. After the network/gNB newly transmits data (e.g., Transport Block (TB)) or Medium Access Control (MAC) Packet Data Unit (PDU) that may be addressed to the G-RNTI or associated with a configured Downlink (DL) assignment for multicast to more than one User Equipment (UE) by multicast, the gNB may retransmit the data that may be addressed to the C-RNTI or CS-RNTI to a (specific) UE or may be addressed to G-CS-RNTI if it was not decoded successfully by the UE. Assume that the UE can be configured with multicast DRX (configuration) and unicast DRX (configuration) at the same time, and each has its own relevant/independent DRX timers (e.g., DRX onDuration timer for multicast (drx-onDurationTimerPTM), DRX onDuration timer for unicast (drx-onDurationTimer), or DRX Inactivity timers (drx-InactivityTimerPTM and drx-InactivityTimer)). Assume that the DRX Command MAC Control Element (CE) may have the same (PDU) format for multicast and unicast.

Figure 7:
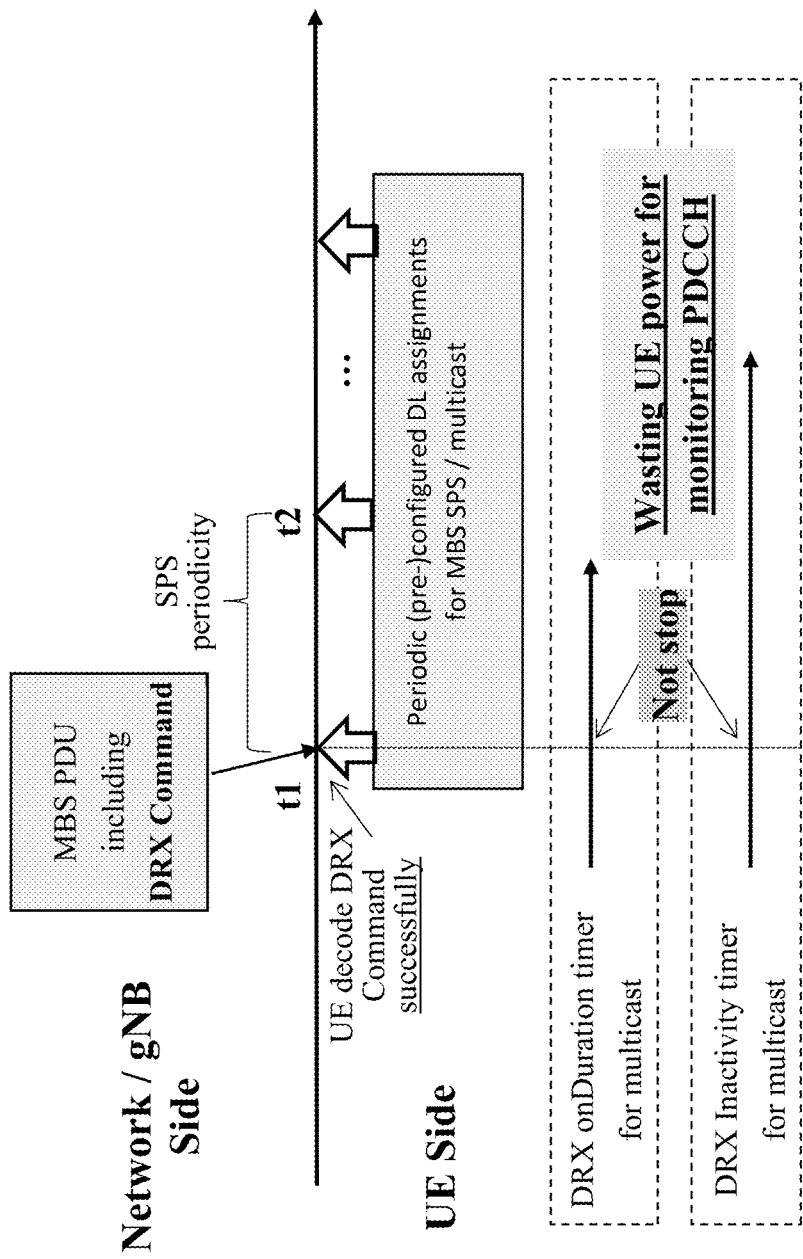
FIG. 7 is an example diagram of wasting UE power, where an SPS configuration for MBS/multicast configured in the UE side and a UE successfully receives/decodes a DRX Command included in a PDU for multicast based on the SPS configuration at t1, in accordance with embodiments of the present invention.
Figure 9:
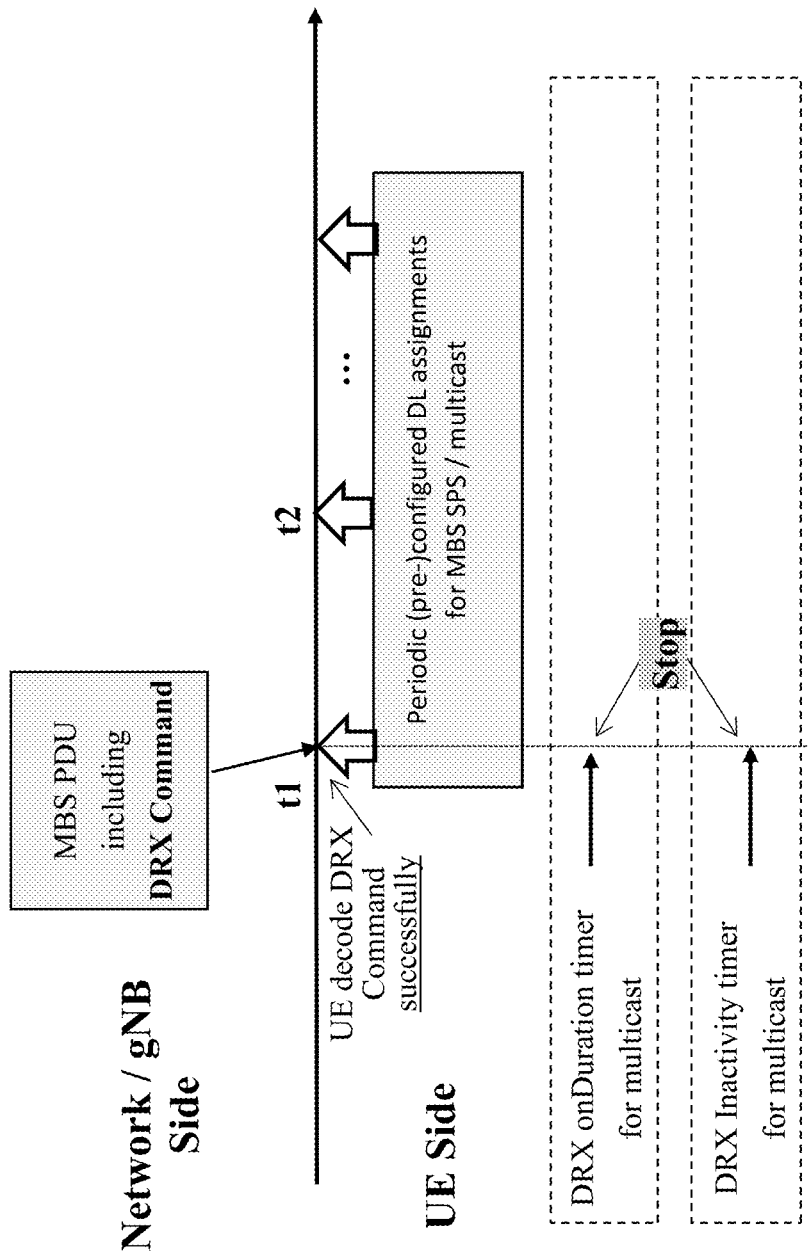
FIG. 9 is an example diagram where a UE does not waste power, where an SPS configuration for MBS/multicast configured in the UE side and a UE successfully receives/decodes a DRX Command included in a PDU for multicast based on the SPS configuration at t1, in accordance with embodiments of the present invention.

According to conventional methods and apparatuses, when a UE receives a DRX Command MAC CE scheduled/sent from a network or gNB, the UE would stop the relevant DRX Timers (e.g., onDuration timers and inactivity timers) for saving the UE's power by not monitoring Physical Downlink Control Channel (PDCCH). However, the network or gNB is not allowed to schedule DRX Command MAC CE on pre-configured downlink assignment (e.g., semi-persistent scheduling, Semi-Persistent Scheduling (SPS)) for multicast or unicast since the UE would not perform the relevant actions of stopping the relevant DRX timers. Considering that it is very possible to use SPS for Multicast and Broadcast Services (MBS)/multicast or unicast service, it is beneficial for the gNB or network to use these periodic transmission opportunities for scheduling/sending a DRX Command MAC CE to the UE. And the UE would perform the actions of stopping the aforementioned DRX timers accordingly for saving UE power. For example, as shown in FIG. 7 (problem) and FIG. 9 (solution), an SPS configuration for MBS/multicast (e.g., the periodicity is the length [t1, t2]) is configured in UE side (based on a Radio Resource Control (RRC) configuration sent from a network/gNB) and a UE successfully receives/decodes a DRX Command included in a PDU for multicast based on the SPS configuration at t1. The UE may stop the relevant aforementioned DRX Timers for multicast (e.g., drx-onDurationTimerPTM and drx-InactivityTimerPTM).

Figure 8:
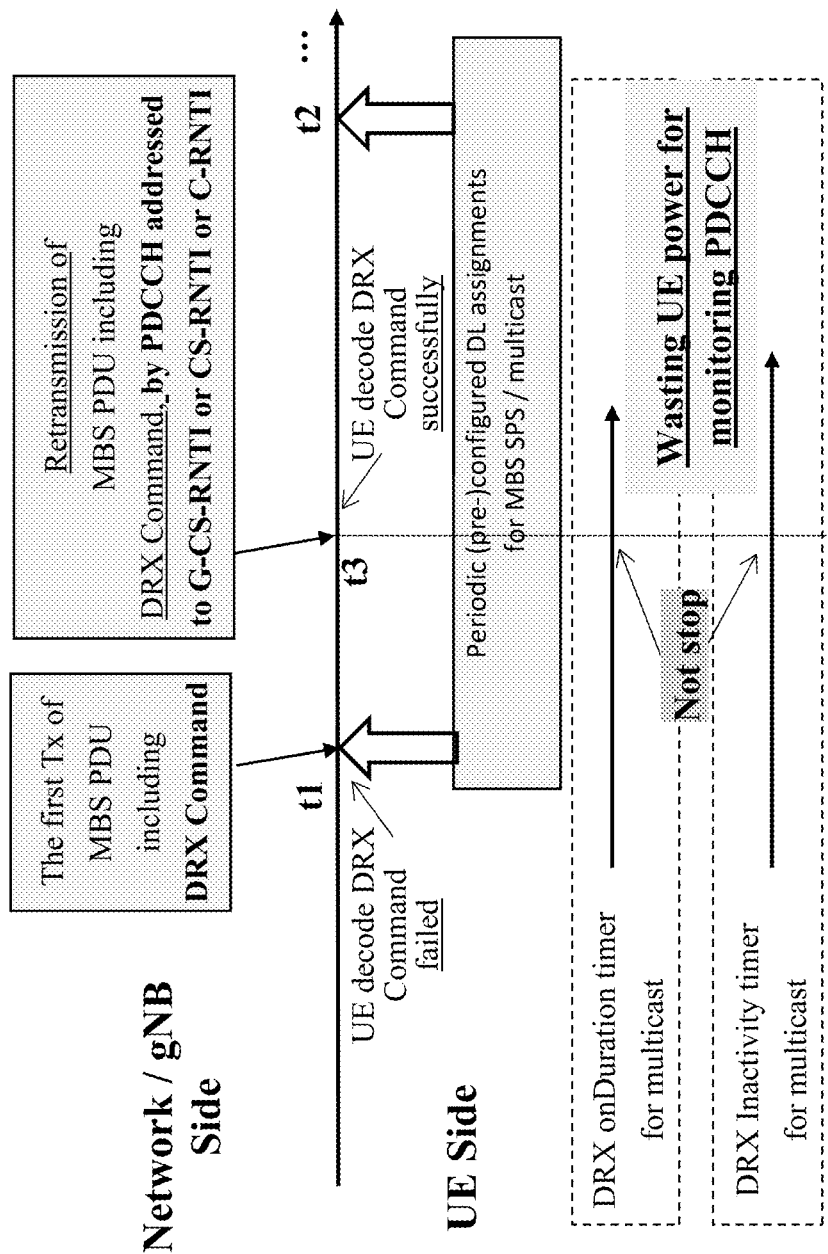
FIG. 8 is an example diagram of wasting UE power, where a UE failed to receive/decode a PDU including a DRX Command for multicast based on the SPS configuration at t1, in accordance with embodiments of the present invention.
Figure 10:
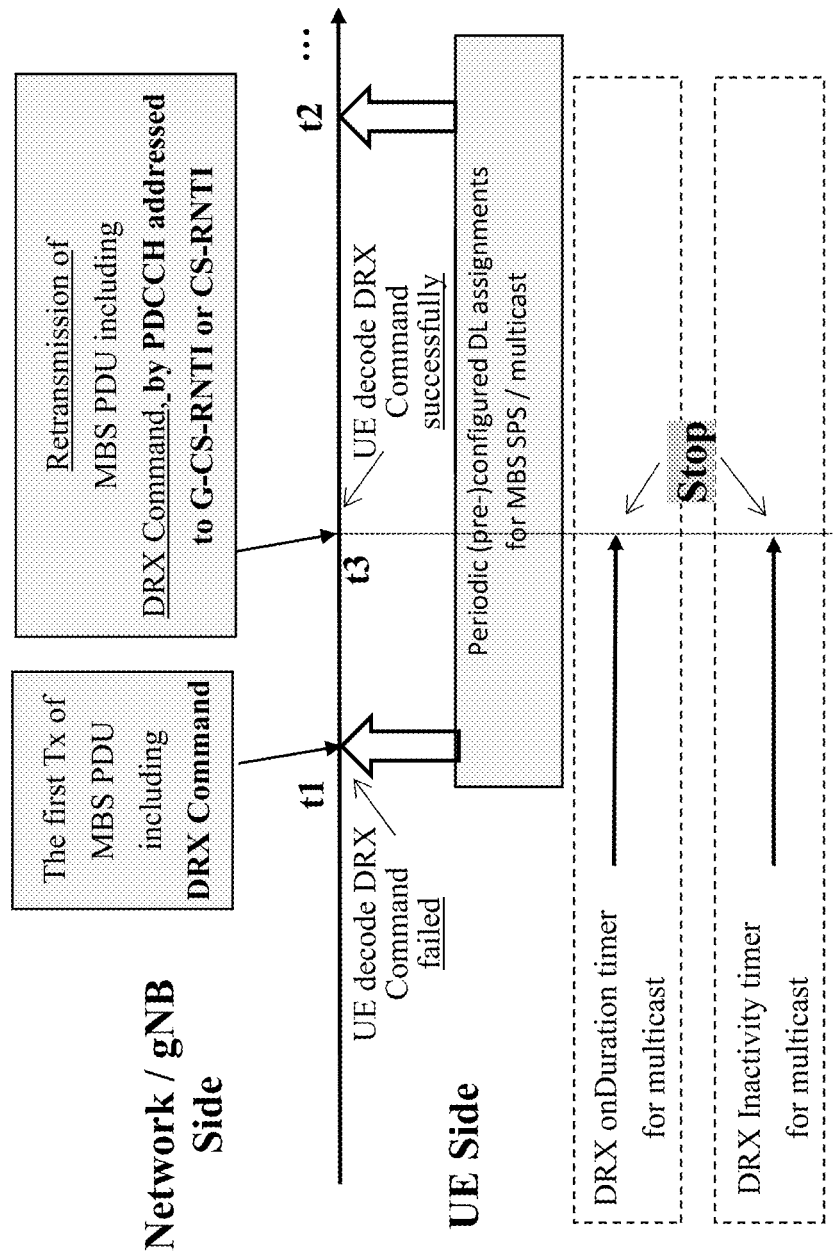
FIG. 10 is an example diagram where a UE does not waste power, where the UE failed to receive/decode a PDU including a DRX Command for multicast based on the SPS configuration at t1, in accordance with embodiments of the present invention.

In addition to the case of pre-configured downlink assignments for multicast (or unicast), a UE may receive the DRX Command MAC by a PDCCH addressed to G-CS-RNTI or CS-RNTI since the (very) first transmission of the MAC PDU/TB including the DRX Command MAC CE may not be decoded successfully. In this case, the UE should also stop the relevant aforementioned DRX Timers for multicast. For example, as shown in FIG. 8 (problem) and FIG. 10 (solution), a UE failed to receive/decode a PDU including a DRX Command for multicast based on the SPS configuration at t1. Of course the UE does not know whether the PDU includes the DRX Command MAC CE at t1. Then the UE successfully receives the DRX Command at t2 by a PDCCH addressed to G-CS-RNTI or CS-RNTI and may stop the relevant aforementioned DRX Timers for multicast (e.g., drx-onDurationTimerPTM and drx-InactivityTimerPTM).

Applying a DRX Command MAC CE to relevant aforementioned DRX timers may mean stopping or starting those timers. If the (very) first or previous transmission of the MAC PDU or TB including the DRX Command MAC CE is associated with multicast, the UE would apply the DRX Command MAC CE for multicast for relevant aforementioned DRX timers and not for unicast DRX timers.

Figure 11:
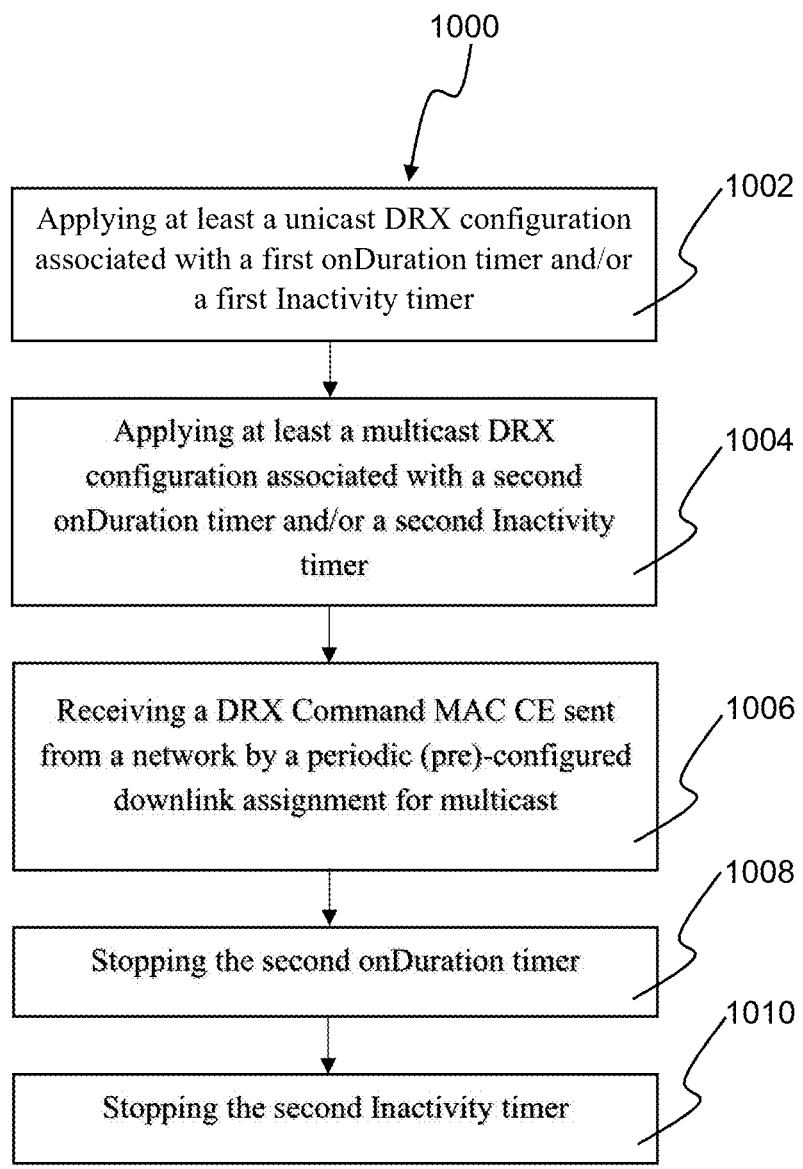
FIG. 11 is a flow diagram of a UE applying at least a unicast DRX configuration, applying at least a multicast DRX configuration, receiving a DRX command MAC CE, stopping a second onDuration timer, and stopping a second Inactivity timer, in accordance with embodiments of the present invention.

Referring to FIG. 11, with this and other concepts, systems, and methods of the present invention, a method 1000 for a UE in a wireless communication system comprises applying at least a unicast DRX configuration associated with a first onDuration timer and/or a first Inactivity timer (step 1002), applying at least a multicast DRX configuration associated with a second onDuration timer and/or a second Inactivity timer (step 1004), receiving a DRX Command MAC CE sent from a network by a periodic (pre)-configured downlink assignment for multicast (step 1006), stopping the second onDuration timer (step 1008), and stopping the second Inactivity timer (step 1010).

In various embodiments, the multicast DRX configuration is associated with a G-CS-RNTI.

In various embodiments, the periodic (pre)-configured downlink assignment for multicast is activated by a PDCCH addressed to the G-CS-RNTI.

In various embodiments, the method further comprises not stopping the first onDuration timer, and not stopping the first Inactivity timer.

In various embodiments, the method further comprises monitoring PDCCH if the first onDuration timer and/or the first Inactivity timer is running, and monitoring PDCCH if the second onDuration timer and/or the second Inactivity timer is running.

In various embodiments, the first onDuration timer is drx-onDurationTimer, and/or the first Inactivity timer is drx-InactivityTimer, and/or the second onDuration timer is drx-onDurationTimerPTM, and/or the second Inactivity timer is drx-InactivityTimerPTM.

Referring back to FIGS. 3 and 4, in one or more embodiments from the perspective of a UE, the device 300 includes a program code 312 stored in memory 310 of the transmitter. The CPU 308 could execute program code 312 to: (i) apply at least a unicast DRX configuration associated with a first onDuration timer and/or a first Inactivity timer; (ii) apply at least a multicast DRX configuration associated with a second onDuration timer and/or a second Inactivity timer; (iii) receive a DRX Command MAC CE sent from a network by a periodic (pre)-configured downlink assignment for multicast; (iv) stop the second onDuration timer; and (v) stop the second Inactivity timer. Moreover, the CPU 308 can execute the program code 312 to perform all of the described actions, steps, and methods described above, below, or otherwise herein.

Referring back to FIGS. 3 and 4, in one or more embodiments from the perspective of a network, the device 300 includes a program code 312 stored in memory 310 of the transmitter. The CPU 308 could execute program code 312 to: (i) apply, at a UE, at least a unicast DRX configuration associated with a first onDuration timer and/or a first Inactivity timer; (ii) apply, at the UE, at least a multicast DRX configuration associated with a second onDuration timer and/or a second Inactivity timer; (iii) transmit, to the UE, a DRX Command MAC CE sent by a periodic (pre)-configured downlink assignment for multicast; (iv) stop, at the UE, the second onDuration timer; and (v) stop, at the UE, the second Inactivity timer. Moreover, the CPU 308 can execute the program code 312 to perform all of the described actions, steps, and methods described above, below, or otherwise herein.

Figure 12:
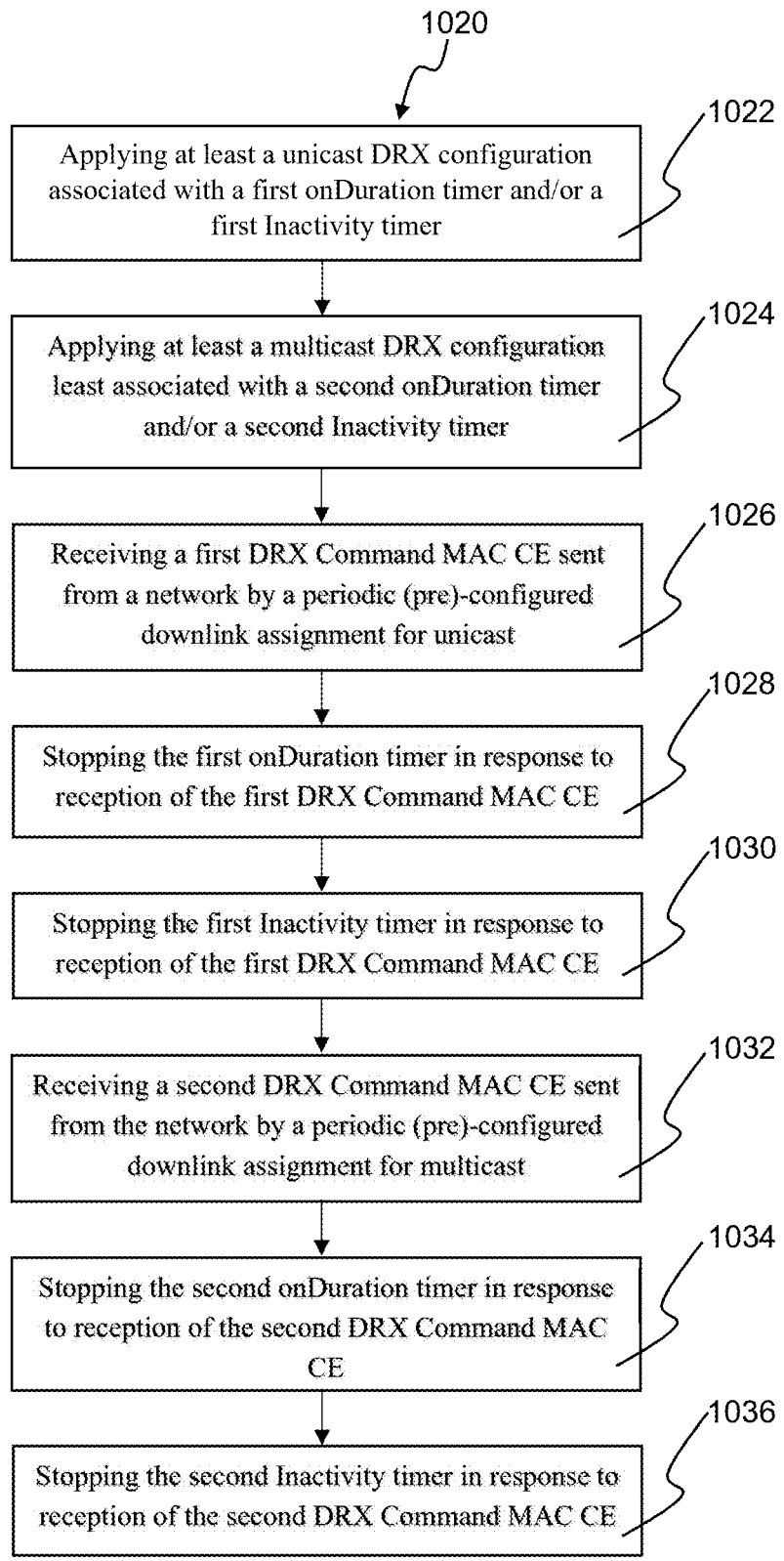
FIG. 12 is a flow diagram of a UE applying at least a unicast DRX configuration, applying at least a multicast DRX configuration, receiving a first DRX Command MAC CE, stopping a first onDuration timer, stopping a first Inactivity timer, receiving a second DRX Command MAC CE, stopping the second onDuration timer, and stopping the second Inactivity timer, in accordance with embodiments of the present invention.

Referring to FIG. 12, with this and other concepts, systems, and methods of the present invention, a method 1020 for a UE in a wireless communication system comprises applying at least a unicast DRX configuration associated with a first onDuration timer and/or a first Inactivity timer (step 1022), applying at least a multicast DRX configuration associated with a second onDuration timer and/or a second Inactivity timer (step 1024), receiving a first DRX Command MAC CE sent from a network by a periodic (pre)-configured downlink assignment for unicast (step 1026), stopping the first onDuration timer in response to reception of the first DRX Command MAC CE (step 1028), stopping the first Inactivity timer in response to reception of the first DRX Command MAC CE (step 1030), receiving a second DRX Command MAC CE sent from the network by a periodic (pre)-configured downlink assignment for multicast (step 1032), stopping the second onDuration timer in response to reception of the second DRX Command MAC CE (step 1034), and stopping the second Inactivity timer in response to reception of the second DRX Command MAC CE (step 1036).

In various embodiments, the first DRX Command MAC CE and the second DRX Command MAC CE have a same format and are associated with a same value 60 of Logical Channel ID.

In various embodiments, the method further comprises monitoring PDCCH if the first onDuration timer and/or the first Inactivity timer is running, and monitoring PDCCH if the second onDuration timer and/or the second Inactivity timer is running In various embodiments, the first onDuration timer is drx-onDurationTimer, and/or the first Inactivity timer is drx-InactivityTimer, and/or the second onDuration timer is drx-onDurationTimerPTM, and/or the second Inactivity timer is drx-InactivityTimerPTM.

Referring back to FIGS. 3 and 4, in one or more embodiments from the perspective of a UE, the device 300 includes a program code 312 stored in memory 310 of the transmitter. The CPU 308 could execute program code 312 to: (i) apply at least a unicast DRX configuration associated with a first onDuration timer and/or a first Inactivity timer; (ii) apply at least a multicast DRX configuration associated with a second onDuration timer and/or a second Inactivity timer; (iii) receive a first DRX Command MAC CE sent from a network by a periodic (pre)-configured downlink assignment for unicast; (iv) stop the first onDuration timer in response to reception of the first DRX Command MAC CE; (v) stop the first Inactivity timer in response to reception of the first DRX Command MAC CE; (vi) receive a second DRX Command MAC CE sent from the network by a periodic (pre)-configured downlink assignment for multicast; (vii) stop the second onDuration timer in response to reception of the second DRX Command MAC CE; and (viii) stop the second Inactivity timer in response to reception of the second DRX Command MAC CE. Moreover, the CPU 308 can execute the program code 312 to perform all of the described actions, steps, and methods described above, below, or otherwise herein.

Referring back to FIGS. 3 and 4, in one or more embodiments from the perspective of a network, the device 300 includes a program code 312 stored in memory 310 of the transmitter. The CPU 308 could execute program code 312 to: (i) apply, at a UE, at least a unicast DRX configuration associated with a first onDuration timer and/or a first Inactivity timer; (ii) apply, at the UE, at least a multicast DRX configuration associated with a second onDuration timer and/or a second Inactivity timer; (iii) transmit, to the UE, a first DRX Command MAC CE sent by a periodic (pre)-configured downlink assignment for unicast; (iv) stop, at the UE, the first onDuration timer in response to reception of the first DRX Command MAC CE; (v) stop, at the UE, the first Inactivity timer in response to reception of the first DRX Command MAC CE; (vi) transmit, to the UE, a second DRX Command MAC CE sent by a periodic (pre)-configured downlink assignment for multicast; (vii) stop, at the UE, the second onDuration timer in response to reception of the second DRX Command MAC CE; and (viii) stop, at the UE, the second Inactivity timer in response to reception of the second DRX Command MAC CE. Moreover, the CPU 308 can execute the program code 312 to perform all of the described actions, steps, and methods described above, below, or otherwise herein.

Text proposal, e.g., for 3GPP TS 38.321 V17.2.0 (2022-09):

5.7 Discontinuous Reception (DRX)

When DRX is configured, the MAC entity shall:
1> if a DRX Command MAC CE is received by PDCCH addressed to C-RNTI or CS-RNTI, or by a configured downlink assignment for unicast transmission or a Long DRX Command MAC CE is received:
Similar Changes as below in 5.7.
2> stop drx-onDurationTimer for each DRX group;
2> stop drx-InactivityTimer for each DRX group.
1> if drx-InactivityTimer for a DRX group expires:
2> if the Short DRX cycle is configured:
3> start or restart drx-ShortCycleTimer for this DRX group in the first symbol after the expiry of drx-InactivityTimer;
3> use the Short DRX cycle for this DRX group.
2> else:
3> use the Long DRX cycle for this DRX group.
1> if a DRX Command MAC CE is received by PDCCH addressed to C-RNTI or CS-RNTI, or by a configured downlink assignment for unicast transmission:
1> if a DRX Command MAC CE is received (initially) by PDCCH addressed to C-RNTI or (initially) by a configured downlink assignment for unicast transmission:
1> if a DRX Command MAC CE is received and the (very) first downlink assignment for the T MAC PDU including the DRX Command MAC CE is received or detected by PDCCH addressed to a C-RNTI or (indicated) by a configured downlink assignment for unicast (transmission):
1> if a DRX Command MAC CE is received for unicast (transmission)
NOTE: The unicast (transmission) means a TB or MAC PDU is received or detected initially by PDCCH addressed to C-RNTI or by a configured downlink assignment for multicast (transmission):
NOTE: The unicast (transmission) means the (very) first downlink assignment for the unicast (transmission) is received or detected by PDCCH addressed to a C-RNTI or indicated by a configured downlink assignment for unicast:
2> if the Short DRX cycle is configured:
3> start or restart drx-ShortCycleTimer for each DRX group in the first symbol after the end of DRX Command MAC CE reception;
3> use the Short DRX cycle for each DRX group.
2> else:
3> use the Long DRX cycle for each DRX group.

5.7b Discontinuous Reception (DRX) for MBS Multicast

When multicast DRX is configured for a G-RNTI or G-CS-RNTI, the MAC entity shall for this G-RNTI or G-CS-RNTI:

1> if a MAC PDU is received in a configured downlink multicast assignment:
2> if HARQ feedback is enabled:
3> start the drx-HARQ-RTT-TimerDL-PTM for the corresponding HARQ process in the first symbol after the end of the corresponding transmission carrying the DL HARQ feedback;
3> start the drx-HARQ-RTT-TimerDL for the corresponding HARQ process in the first symbol after the end of the corresponding transmission carrying the DL HARQ feedback.
2> stop the drx-RetransmissionTimerDL-PTM for the corresponding HARQ process;
2> stop the drx-RetransmissionTimerDL for the corresponding HARQ process.
1> if a drx-HARQ-RTT-TimerDL-PTM expires:
2> if the data of the corresponding HARQ process was not successfully decoded:
3> start the drx-RetransmissionTimerDL-PTM for the corresponding HARQ process in the first symbol after the expiry of drx-HARQ-RTT-TimerDL-PTM.
1> if a DRX Command MAC CE is received by PDCCH addressed to a G-RNTI or G-CS-RNTI or C-RNTI or CS-RNTI, or by a configured downlink assignment for multicast:
1> if a DRX Command MAC CE is received (initially) by PDCCH addressed to a G-RNTI (or G-CS-RNTI), or (initially) by a configured downlink assignment for multicast:
2> if a DRX Command MAC CE is received and the (very) first downlink assignment for the TB/MAC PDU including the DRX Command MAC CE is received or detected by PDCCH addressed to a G-RNTI or G-CS-CRNTI or (indicated) by a configured downlink assignment for multicast (transmission):
2> if a DRX Command MAC CE is received for multicast (transmission)
NOTE: The multicast (transmission) means a TB or MAC PDU is received or detected initially by PDCCH addressed to G-RNTI or G-CS-RNTI or by a configured downlink assignment for (MBS) multicast:
NOTE: The multicast (transmission) means the (very) first downlink assignment for the multicast (transmission) is received or detected by PDCCH addressed to a G-RNTI or
G-CS-RNTI or (indicated) by a configured downlink assignment for multicast:
2> stop drx-onDurationTimerPTM of the DRX for this G-RNTI or G-CS-RNTI;
2> stop drx-InactivityTimerPTM of the DRX for this G-RNTI or G-CS-RNTI.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
applying at least a unicast Discontinuous Reception (DRX) configuration associated with a first onDuration timer and/or a first Inactivity timer;
applying at least a multicast DRX configuration associated with a second onDuration timer and/or a second Inactivity timer;
receiving a first DRX Command Medium Access Control (MAC) Control Element (CE) sent from a network by a periodic (pre)-configured downlink assignment for unicast;
stopping the first onDuration timer in response to reception of the first DRX Command MAC CE;
stopping the first Inactivity timer in response to reception of the first DRX Command MAC CE;
receiving a second DRX Command MAC CE sent from the network by a periodic (pre)-configured downlink assignment for multicast, wherein the first DRX Command MAC CE and the second DRX Command MAC CE have a same format and are associated with a same Logical Channel Identity (ID);

stopping the second onDuration timer in response to reception of the second DRX Command MAC CE; and stopping the second Inactivity timer in response to reception of the second DRX Command MAC CE.

2. The method of claim 1, wherein a value of the same Logical Channel ID Identity is 60.

3. The method of claim 1, further comprising:

monitoring Physical Downlink Control Channel (PDCCH) if the first onDuration timer and/or the first Inactivity timer is running; and monitoring PDCCH if the second onDuration timer and/or the second Inactivity timer is running.

4. The method of claim 1, wherein:

the first onDuration timer is drx-onDurationTimer; and/or the first Inactivity timer is drx-InactivityTimer; and/or the second onDuration timer is drx-onDurationTimerPTM; and/or the second Inactivity timer is drx-InactivityTimerPTM.

5. A method of a User Equipment (UE), comprising:

applying at least a unicast Discontinuous Reception (DRX) configuration associated with a first onDuration timer and/or a first Inactivity timer;

applying at least a multicast DRX configuration associated with a second onDuration timer and/or a second Inactivity timer;

receiving a DRX Command Medium Access Control (MAC) Control Element (CE) sent from a network by a periodic (pre)-configured downlink assignment; and in response to reception of the DRX Command MAC CE, stopping the first onDuration timer and the first Inactivity timer if the periodic (pre)-configured downlink assignment is used for unicast data reception by the UE; and stopping the second onDuration timer and the second Inactivity timer if the periodic (pre)-configured downlink assignment is used for multicast data reception by the UE.

6. The method of claim 5, further comprising:

monitoring Physical Downlink Control Channel (PDCCH) if the first onDuration timer and/or the first Inactivity timer is running; and monitoring PDCCH if the second onDuration timer and/or the second Inactivity timer is running.

7. The method of claim 5, wherein:

the first onDuration timer is drx-onDurationTimer; and/or the first Inactivity timer is drx-InactivityTimer; and/or the second onDuration timer is drx-onDurationTimerPTM; and/or the second Inactivity timer is drx-InactivityTimerPTM.

* * * * *